US009550573B2

(12) United States Patent
Ersan et al.

(10) Patent No.: US 9,550,573 B2
(45) Date of Patent: Jan. 24, 2017

(54) HIGH DENSITY AIRCRAFT SEAT ARRANGEMENT

(71) Applicant: Zodiac Seats UK Limited, Gwent (GB)

(72) Inventors: Ali Ersan, Greater London (GB); Richard Nicholas, Greater London (GB); John McKeever, Greater London (GB)

(73) Assignee: Zodiac Seats UK Limited, Cwmbran (GB)

( * ) Notice: Subject to any disclaimer, the term of this patent is extended or adjusted under 35 U.S.C. 154(b) by 0 days.

(21) Appl. No.: 14/376,617

(22) PCT Filed: Mar. 15, 2013

(86) PCT No.: PCT/GB2013/050645
§ 371 (c)(1),
(2) Date: Aug. 5, 2014

(87) PCT Pub. No.: WO2013/136080
PCT Pub. Date: Sep. 19, 2013

(65) Prior Publication Data
US 2015/0001341 A1 Jan. 1, 2015

(30) Foreign Application Priority Data
Mar. 16, 2012 (GB) .................................. 1204679.3

(51) Int. Cl.
*B64D 11/06* (2006.01)
(52) U.S. Cl.
CPC ........... *B64D 11/06* (2013.01); *B64D 11/0601* (2014.12); *B64D 11/0606* (2014.12); *B64D 11/0641* (2014.12)

(58) Field of Classification Search
CPC ...................................................... B64D 11/06
(Continued)

(56) References Cited

U.S. PATENT DOCUMENTS

| 2,947,349 A | 8/1960 | Kryter |
| 6,227,489 B1 | 5/2001 | Kitamoto et al. |

(Continued)

FOREIGN PATENT DOCUMENTS

| GB | 907472 | 10/1962 |
| GB | 2405791 A | 3/2005 |

(Continued)

OTHER PUBLICATIONS

PCT/GB2013/050645, Search Report and Written Opinion dated Sep. 23, 2013, 20 pages.

*Primary Examiner* — Christopher P Ellis
*Assistant Examiner* — Jessica Wong
(74) *Attorney, Agent, or Firm* — Kilpatrick Townsend & Stockton LLP; Dean W. Russell

(57) ABSTRACT

An aircraft cabin (26) has a plurality of seat units (10) including first (10) and second (12) seat units in a first row (22) and a third seat unit (14) in a second row (24). The first and second seat units (10, 12) are separated by an aisle (38). The seats all face in the same direction (31), said direction (31) being inclined to the longitudinal axis (30) by a seat offset angle (Sθ), and are configurable between a bed mode and a seat mode. A console (20a) of the first seat unit (10) is directly adjacent to the aisle (38) and accommodates a foot-well (40) for use by a passenger in the seat (18c) of the third seat unit (14). At least a part of the console (20a) of the first seat unit (10), in a region no higher than a first distance from the floor, extends further into the aisle (38) than the rest of the first seat unit (10) in a region higher than the first distance from the floor.

11 Claims, 14 Drawing Sheets

(58) Field of Classification Search
USPC .................................................... 244/118.6
See application file for complete search history.

(56) References Cited

U.S. PATENT DOCUMENTS

| | | |
|---|---|---|
| 7,578,470 B2 | 8/2009 | Plant |
| 7,918,504 B2 | 4/2011 | Thompson |
| D696,034 S * | 12/2013 | Ersan et al. .................. D6/356 |
| 2007/0246981 A1 | 10/2007 | Plant |
| 2009/0146004 A1* | 6/2009 | Plant .......................... 244/118.5 |
| 2009/0243352 A1 | 10/2009 | Cailleteau |
| 2010/0065683 A1* | 3/2010 | Darbyshire ............ B64D 11/06 244/118.6 |
| 2010/0252680 A1* | 10/2010 | Porter ........................ 244/118.6 |
| 2011/0186682 A1 | 8/2011 | Collins et al. |
| 2011/0210204 A1 | 9/2011 | Collins et al. |

FOREIGN PATENT DOCUMENTS

| | | |
|---|---|---|
| GB | 2438162 A | 11/2007 |
| WO | 03013903 A1 | 2/2003 |
| WO | 2004083035 A1 | 9/2004 |
| WO | 2005077758 A1 | 8/2005 |
| WO | 2009073244 A1 | 6/2009 |
| WO | 2010038022 A2 | 4/2010 |
| WO | 2011141134 A1 | 11/2011 |

* cited by examiner

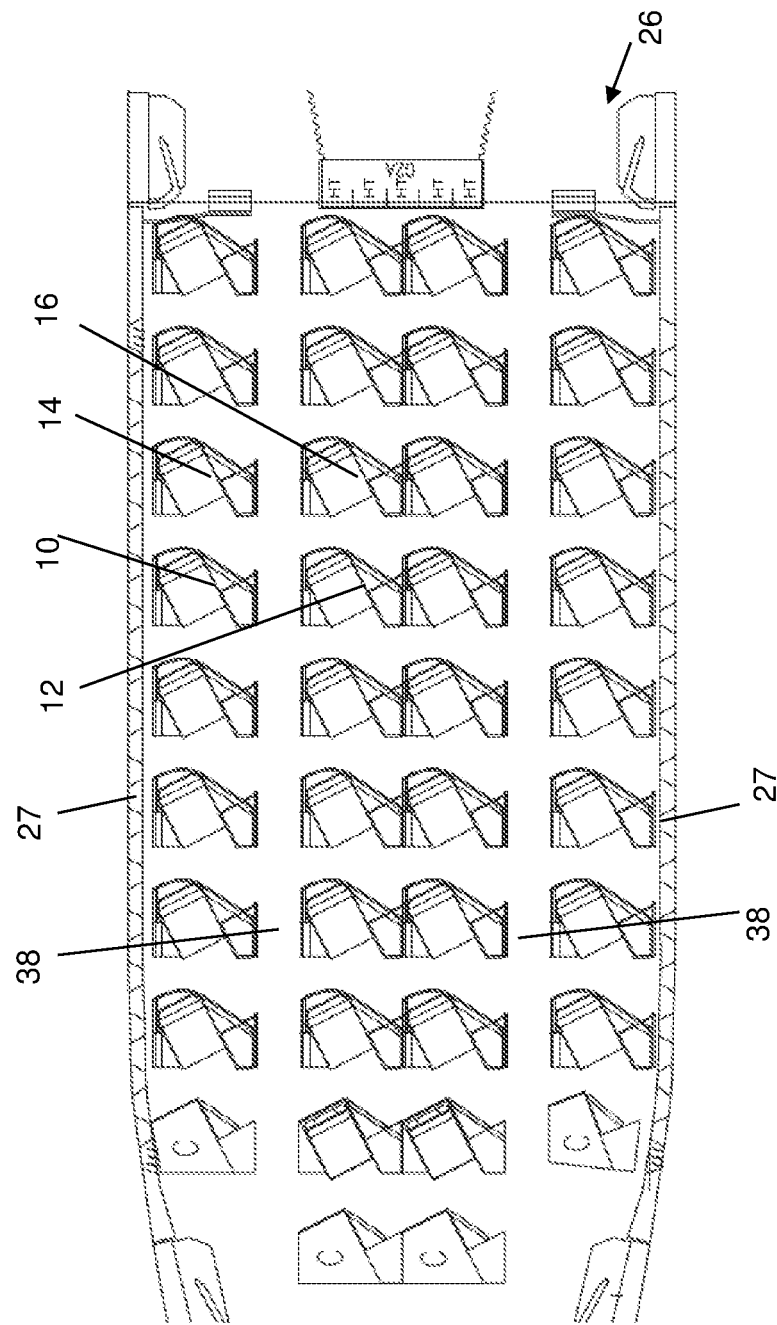

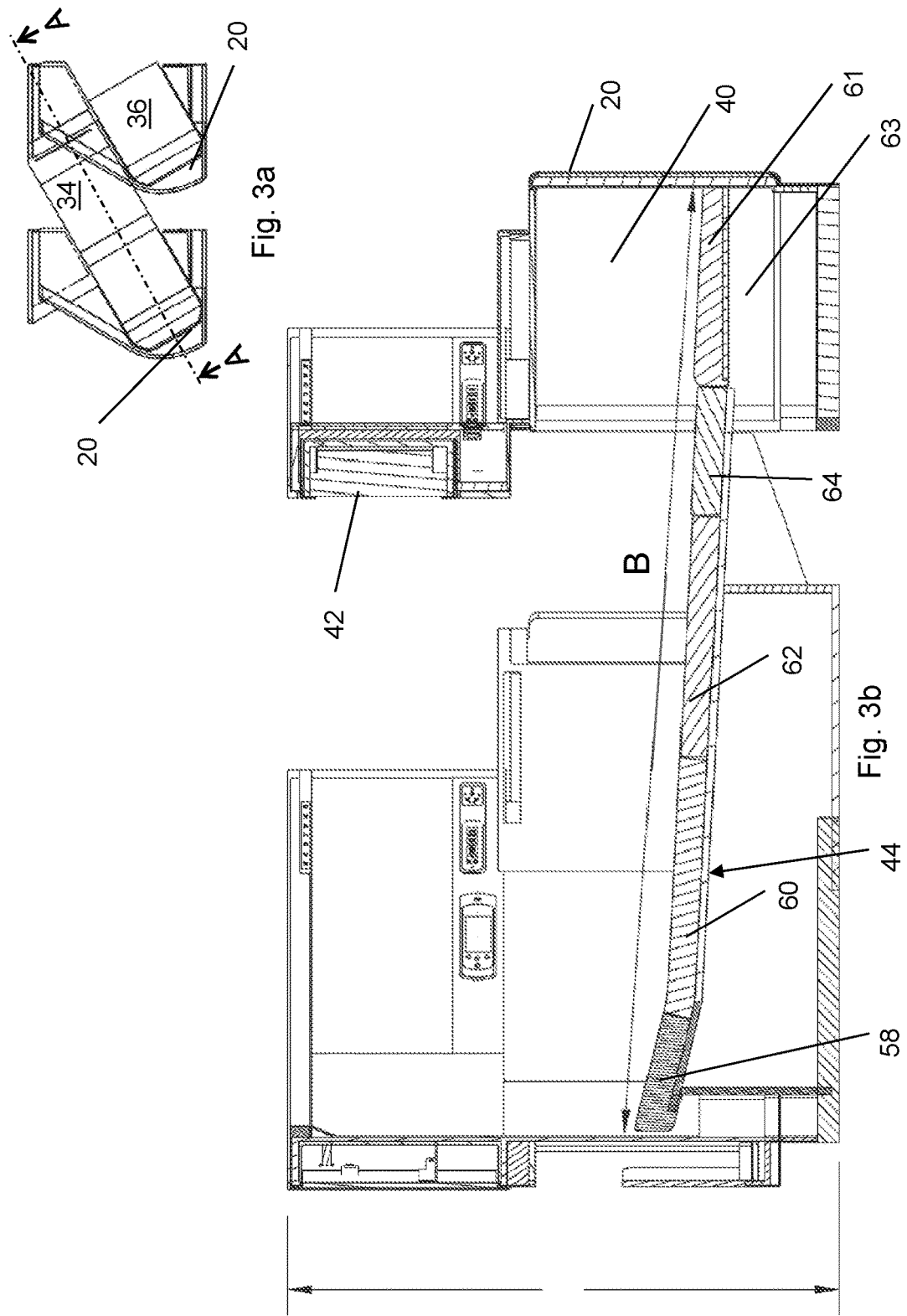

HIGH DENSITY AIRCRAFT SEAT ARRANGEMENT

CROSS REFERENCE TO RELATED APPLICATIONS

This application is the U.S. national phase of International Application No. PCT/GB2013/050645 filed on Mar. 15, 2013 and titled "High Density Aircraft Seat Arrangement," which claims priority benefits from Great Britain Application No. 1204679.3 filed on Mar. 16, 2012 and titled "High Density Aircraft Seat Arrangement," the entire contents of both of which are incorporated herein by reference.

TECHNICAL FIELD

The present invention concerns an aircraft seat arrangement, preferably a high density aircraft seat arrangement, where the seats are convertible to beds and are for use in a cabin class superior to standard/economy seating arrangements, for example a business class cabin space. More particularly, but not exclusively, this invention concerns an aircraft cabin in which there are installed a plurality of seat units arranged in a plurality of rows, especially business class seat units.

BACKGROUND OF THE INVENTION

When designing a business and/or premium economy seat and corresponding LOPA (Layout of Passenger Accommodations) there are the inherently conflicting requirements of providing the feeling of space and comfort for the passenger whilst providing a high density seating configuration to maximise revenues for airlines. Passengers typically expect a lie-flat bed and a personal and private space, with access to storage areas, a personal TV/VDU monitor, a table and preferably other surfaces for use as a shelf or table. A privacy shell to provide the feeling of a private space may also be desirable. It is also desirable for a seat design and LOPA to be readily configurable for use in as many of the mainstream and common modern aircraft currently being manufactured and sold, such as for example Airbus' A330, A350, and A380 and Boeing's 747, 777, and 787.

Seat units of the prior art typically achieve such requirements, whilst also providing reasonably efficient packing of the seats in a given volume, by means of herringbone-type arrangements of seats and/or by means of creating foot-well regions that interface in a geometrically efficient manner in relation to the seats in front of the seats of the passengers using such foot-wells. A herringbone configuration is one in which the seats are orientated such that they face in a direction inclined to the longitudinal axis by a seat offset angle, although it is common for adjacent seats to face in different directions (e.g. one seat being inclined relative to the longitudinal axis by a seat offset angle in a clockwise direction and the adjacent seat being inclined relative to the longitudinal axis by a seat offset angle in an anti-clockwise direction). Some configurations have adjacent seats inclined to the longitudinal axis by a seat offset angle of the same sign. The higher the seat offset angle the lower the seat pitch needs to be (the seat pitch being the distance between rows in the direction perpendicular to the rows). Having a long seat pitch can compromise on packing efficiency, if the length of cabin is not close to an integer number multiplied by the seat pitch. Increasing the seat offset angle may reduce the number of seats that can be provided across the width of the cabin. Increasing the seat offset angle may also create areas of space between seat units and cabin walls or between seat units and an aisle that could risk wasting space if not utilised wisely.

Some examples of the prior art will now be described.

U.S. Pat. No. 6,227,489 discloses an aircraft cabin, in which there are installed seat units, each seat unit having a lie-flat seat and a console adjacent to the seat, the seat being configurable between a bed mode and a seat mode. Some of the seats, towards the nose of the aircraft, face in a direction inclined to the longitudinal axis. The console of a seat unit accommodates a foot-well for use by a passenger in the seat behind. The seat units do not appear to be designed to face in the same direction or to be arranged in rows where two or more seats are grouped together in the row. The seat arrangement is not particularly high density and is therefore more suitable to a first class suite of seat units.

WO 2009/073244 discloses an aircraft cabin, in which there are installed a plurality of lie-flat seats arranged in rows. The seats are arranged as three pairs per row, an aisle being defined between adjacent pairs. The seats in each pair are separated by a console. Some of the seats face in the same direction, said direction being inclined to the longitudinal axis of the cabin by an angle of about 15 degrees (the angle measured in the clockwise direction). Other seats face in a different direction, but inclined to the longitudinal axis of the cabin by an angle of about 15 degrees (the angle in this case being measured in the anti-clockwise direction). The feet of a passenger in a seat behind a console between two seats in front may be accommodated in a foot-well to the rear of the console. The low angle of inclination of the seats relative to the longitudinal axis of the cabin translates into a relatively long pitch of seat. Such a long pitch can affect packing efficiency in certain aircraft cabin layouts.

U.S. Pat. No. 7,918,504 discloses an aircraft cabin in which there are installed rows of seat units each unit having a forward facing lie-flat seat and an associated console, the seats facing in a direction parallel to the longitudinal axis of the cabin. The consoles provide foot-wells for the seats behind and successive rows alternate in configuration such that the consoles in one row are directly in front of the seats in the row behind. The armrest of a seat in one row overhangs the foot-well of the seat behind, providing a space-packing efficiency. However, the seats being arranged to face parallel to the longitudinal axis of the cabin translates into a relatively long pitch of seat, which may adversely affect packing efficiency in certain aircraft cabin layouts.

U.S. Pat. No. 2,947,349 discloses an aircraft cabin in which there are installed angled rows of seat units each unit having a seat and an associated console. The seats face in a direction offset from the longitudinal axis of the cabin, but perpendicular to the direction in which the row extends across the aircraft cabin. The consoles in a row provide footrests for the seats in the row behind and armrests for the seats in the same row. The seats are not configured for conversion into a bed-mode.

When designing seats and LOPAs, consideration needs to be given not only to the requirements of the seated passenger and the available volume in the cabin but also to the requirements for sufficient access to and from and along the aisles of the aircraft. The aisles defined between seat units on a commercial aircraft need not be as wide at feet level as at arm level, given that the width of free space required by an average person when walking is greater above the waist than at feet level. The Federal Aviation Regulations specify that, unless special circumstances apply, for an aircraft having a passenger seating capacity of 20 or more, the passenger aisle width at any point between seats must equal or exceed 15 inches (~381 mm) at a height of less than 25 inches (~635 mm) and must equal or exceed 20 inches (~508 mm) at a height of 25 inches (635 mm) or more. Aircraft manufacturers also recommend certain minimum aisle widths. Airbus recommends a minimum aisle width of 15.25 inches (~387 mm) below a height of 25 inches (~635 mm) and a minimum aisle width of 20.25 inches (~514 mm) above a height of 25 inches (635 mm). Boeing recommends a minimum aisle width of 15.5 inches (~394 mm) below a height of 25 inches (~635 mm) and a minimum aisle width of 20.5 inches (~521 mm) above a height of 25 inches (~635 mm). Seat manufacturers tend to aim for minimum aisle widths higher than the figures stated above in order to provide air-crew better access along the aisle. An aisle width of at least 17 inches is preferred for example.

The present invention seeks to mitigate one or more of the above-mentioned problems. Alternatively or additionally, the present invention seeks to provide an improved high density seating system that can be utilised in a business class cabin region in an aircraft.

SUMMARY OF THE INVENTION

The present invention provides, in accordance with a first aspect, an aircraft cabin having a floor and a longitudinal axis, in which cabin there are installed a plurality of seat units including first and second seat units in a first row of seat units and a third seat unit in a second row of seat units, wherein (a) each seat unit includes a seat and a console adjacent to the seat, the seat being configurable between a bed mode and a seat mode, (b) the cabin includes an aisle extending parallel to the longitudinal axis, the first and second seat units being separated by the aisle, (c) the seats of each of the first, second and third seat units all face in the same direction, said direction being inclined to the longitudinal axis by a seat offset angle, (d) the console of the first seat unit is directly adjacent to the aisle and accommodates a foot-well for use by a passenger in the seat of the third seat unit, and (e) at least a part of the console of the first seat unit, in a region no higher than a first distance (for example 25 inches or 635 mm) from the floor, extends further into the aisle than the rest of the first seat unit in a region higher than the first distance from the floor. Thus, in accordance with the present invention valuable space can be utilised at a position relatively close to the floor, by a console that provides the function of a foot-well, where such space might otherwise be given up to the aisle. Decreasing the amount of space in the aisle at a low-level does not impede access or usability of the aisle, especially as the width of the aisle at a higher level can be more generous. Using space that might otherwise be aisle space in this manner effectively releases several inches worth of real estate across the width of the cabin for use by seated passengers. Given the value placed on useable space per passenger and on achieving increased density of seated passengers per unit area (sometimes referred to as "PAX density"), just creating a few extra inches space can make a very significant difference to the attractiveness of a LOPA to passengers and airlines alike.

The invention is of particular application to an aircraft in which there are limits imposed on the aisle width above and below a certain distance from the floor of the cabin. For example, there may be requirements imposed on the minimum aisle widths above and below the first distance from the floor. The aisle width may, within a range of heights, be defined as the shortest distance between the monuments, for example the seat units, mounted either side of the aisle. Thus, in accordance with the present invention, there may be a first aisle-width-value equal to the shortest distance between the first and second seat units at any height less than the first distance from the floor and a second aisle-width-value equal to the shortest distance between the first and second seat units at any height greater than the first distance from the floor. The first aisle-width-value may have a value such that it is not less than a predetermined first minimum width (for example 15.5 inches or 394 mm), but is less than a predetermined second minimum width (for example 20.5 inches or 521 mm), the second minimum width being greater than the first minimum width. The second aisle-width-value may have a value such that it is not less than the second minimum width.

The second row of seat units may be behind the first row of seats units.

The seat offset angle is not zero.

Each seat unit may include a shell. The shell may extend around the back of the seat of the seat unit. The shell may be in the form of a privacy shell, which is provided to shield at least in part the passenger from other passengers in the vicinity. The shell may extend from the back of the seat towards the front of the seat in the region of the right hand side or left hand side of the seat, and preferably extends from the back of the seat towards the front of the seat both to the right of the seat and to the left of the seat, thus enhancing privacy. The shell of at least one of the first seat unit and the second seat unit may be so arranged that the second aisle-width-value mentioned above extends to a point on the shell (i.e. the shortest measured aisle width measured above the first distance above the floor is defined by the position of the shell). The second aisle-width-value may represent a distance from a point on the shell of the first seat unit and a point on the shell of the second seat unit. The shell of each seat unit preferably extends to a region above the console. The shell of each seat unit preferably extends to a region near to, but short of, the far end (in the direction from the seat to the console) of the console of the seat unit. A monitor may be provided in a shell; such a feature is described in further detail later.

The shell may be positioned relatively closely to the back of the seat (when the seat is in seat mode). There may for example be a gap of less than 10 mm between the back of the seat and the corresponding opposing surface of the shell. The surface of the shell which faces the back of the seat may extend up from the cabin floor in a substantially vertical direction. The conversion of a seat from seat mode to bed mode may require moving the back of the seat from a substantially upright position to a substantially horizontal position. The movement of the seat from seat mode to bed mode may involve a combination of movement and rotation downwards of the seat back and movement of at least a portion of the seat back away from the shell, whilst the uppermost (in seat mode) passenger supporting portion (for example the head-rest) moves in a direction that is parallel or close to parallel to the adjacent shell surface.

The cabin may be configured such that the first row of seat units, and preferably also the second row of seat units, extends from a respective window seat unit on one side of the cabin to a respective window seat unit on the opposite side of the cabin, there being one or more aisles extending parallel to the longitudinal axis. (It will be appreciated here that the term "window seat" is used herein to refer to an outboard seat that is the seat closest to a given outboard cabin wall, which may or may not have one or more windows in it in the region of the seat; a window seat in the present context need not necessarily be associated with any particular window). Preferably there are two aisles extending parallel to the longitudinal axis. Preferably, there are four or more seats to a row. Each row may include at least one set of two or more adjacent seat units. There may be at least one aisle defined between such a set of seat units and a seat unit spaced apart from such a set. Preferably, the seats are in a 1-2-1 configuration; that is, a single seat unit between the cabin side-wall and a first aisle, a pair of adjacent seat units between the first aisle and a second aisle, and a single seat unit between the second aisle and the opposite cabin side-wall. Inherent in the configuration of the seat units of the present invention is that each seat unit in each row that is adjacent to an aisle either faces (at least partly) towards the aisle or (at least partly) away from the aisle. It is preferred that in respect of any seat unit adjacent to an aisle which faces away from the aisle, the nearest seat unit on the opposite side of the aisle faces the aisle. This avoids having seats arranged back-to-back across an aisle, which could otherwise place demands on aisle width. Preferably, all seats are inclined to the longitudinal axis by the same seat offset angle and in the same sense (i.e. all clockwise or all anticlockwise).

The present invention also provides a seat unit configured for use as a seat unit of the aircraft cabin described above. Preferably, the seat unit is configured for use as the first seat unit as described above.

There may be application of a seat arrangement having certain benefits of embodiments of the present invention, yet where the console of the first seat unit does not extend further into the aisle than another, higher, part of the first seat unit. As such, the present invention provides in accordance with a second aspect of the invention, an aircraft cabin having a floor and a longitudinal axis, in which cabin there are installed a plurality of seat units including first and second seat units in a first row of seat units and a third seat unit in a second row of seat units, wherein (a) each seat unit includes a seat and a console adjacent to the seat, the seat being configurable between a bed mode and a seat mode, (b) the cabin includes an aisle extending parallel to the longitudinal axis, the first and second seat units being separated by the aisle, (c) the seats of each of the first, second and third seat units all face in the same direction, said direction being inclined to the longitudinal axis by a seat offset angle, and (d) the console of the first seat unit is directly adjacent to the aisle and accommodates a foot-well for use by a passenger in the seat of the third seat unit. Preferably, in this second aspect of the invention, (e) the first row of seat units and the second row of seat units each extend from a respective window seat unit on one side of the cabin to a respective window seat unit on the opposite side of the cabin, there being one or more aisles extending parallel to the longitudinal axis, and (f) each seat unit in each row that is adjacent to an aisle either faces towards the aisle or away from the aisle, and in respect of any seat unit adjacent to an aisle which faces away from the aisle, the nearest seat unit on the opposite side of the aisle faces the aisle.

The seat offset angle is not zero.

It will be appreciated that features, whether optional or essential, of the first aspect of the invention may be incorporated into this second aspect of the invention. For example, all seats in a row may face in the same direction. The description that now follows refers to features of the first aspect of the invention (although as stated above such features may be incorporated also into the second aspect).

According to the present invention there are at least two rows of seat units, each seat unit including a seat and a console adjacent to the seat, the seat being configurable between a bed mode and a seat mode, the seats each facing a direction inclined to the longitudinal axis, with a console in one row accommodating a foot-well for use by a passenger in a seat in an adjacent row. Preferably, there are more than three such rows of seat units.

The seat units in each row may include two seat units that are centred on the cabin floor at substantially the same distance along the cabin measured in a longitudinal direction. There may be three seat units in the same row that are so centred at substantially the same longitudinal distance along the cabin. One or both seat units that have a window seat may be positioned in staggered configuration in relation to the rest of the row to which the window seat belongs, such that that the seat unit having the window seat is centred on the cabin floor at a distance along the cabin measured in a longitudinal direction different from the corresponding distance for an inboard seat unit. Staggering outboard seat units in this manner can assist in creating a wider aisle and/or freeing-up more usable space. Preferably, however, all seat units in the same row are centred at substantially the same longitudinal distance along the cabin. Such a configuration provides a conventional look and feel to the cabin, in that seats are arranged in perpendicular columns and rows (albeit with the seats inclined when viewed from above relative to both the direction of the columns and the direction of the rows) such that ingress and egress walkways between rows of seats are perpendicular to the longitudinal axis. Preferably, each row of seat units extends in a direction perpendicular to the longitudinal axis.

Preferably, the aisle is such that there is a notional cylindrical shape with an axis parallel to the longitudinal axis that fits within the aisle and which has a minimum width below the first distance from the floor that is substantially the same as the first aisle-width-value and has a minimum width above the first distance from the floor that is substantially the same as the second aisle-width-value. Thus, the first and second minimum widths, which preferably determine the lowest allowable first aisle-width-value and second aisle-width-value aisle, may be achieved without needing to have an aisle with a minimum width that weaves to and fro along the length of the aisle. LOPAs of the prior art which comprise a set of staggered seats each facing in a direction inclined to the longitudinal axis (e.g. a herringbone layout) have tended to achieve the minimum aisle width criteria by means of staggering the seats and allowing the aisle to have a minimum width that weaves to and fro along the length of the aisle, thus forcing passengers who walk along the aisle to adopt a corresponding weaving walk.

The console of a seat unit (i.e. adjacent to the seat unit), preferably of each seat unit, preferably provides space that is configured for use by a passenger in a seat adjacent to the console (preferably the seat belonging to the same seat unit as the console). The console of a seat unit, preferably each seat unit, may define an upper surface providing space useable by a passenger in a seat adjacent to the console (preferably the seat belonging to the same seat unit as the console). The upper surface may have a footprint that shares at least some space of the footprint of the foot-well defined by the console.

The console of a seat unit may have a substantially flat upper surface.

The console of a seat unit may have an upper surface at a suitable height to provide an arm-rest surface for use by a passenger in the seat of the seat unit.

One or more of the seat units may each include an arm-rest surface for use by a passenger in the seat of the seat unit. The arm-rest surface preferably has a footprint that does not overlap with the footprint of the foot-well defined by the console. The arm-rest surface preferably has a footprint that is positioned behind (relative to the direction the seat faces) the footprint of the foot-well defined by the console. The arm-rest surface for use by a passenger in the seat may overhang a space behind the foot-well of the console, such space being suitable for accommodating the legs of a passenger whose feet are in the foot-well.

In accordance with the first aspect of the invention, at least a part of the console of the first seat unit, in a region no higher than the first distance from the floor, extends further into the aisle than the rest of the first seat unit in a region higher than the first distance from the floor. As a consequence, a part of the first seat unit positioned above the first distance from the floor may have a footprint which extends to near to, but short of, the footprint of said at least a part of the console of the first seat unit (in the direction towards the aisle). As mentioned above, a part of the shell of the first seat unit positioned above the console may have a footprint which extends to near to, but short of, the footprint of the console. If the console has a height greater than the first distance from the floor, an upper part of the console may have a footprint which extends to near to, but short of, the footprint of the console at a height equal to or less than the first distance from the floor. The console of a seat unit will typically, have a far surface on a lower part of the console below the first distance from the floor, the far surface being on the opposite side of the console from the seat of the seat unit. The console of at least the first seat unit, and preferably all the seat units, may have an upper surface positioned above the first distance from the floor and which has a footprint which extends to near to, but short of, the footprint of the far surface. There may therefore be step from the upper surface of the console to the far surface of the console. In the case where there is a shell which extends onto or above the console and a part of the shell has a footprint which extends to near to, but short of, the footprint of the console, the upper surface and the shell may terminate at substantially the same position next to the aisle (i.e. as considered in a horizontal direction across the width of the cabin).

There may be step change in the width of the aisle between a low-level and a higher level.

The foot-well in the console may include an upper surface which in use acts as an extension to the bed surface defined by the upper surface of the seat when in its bed-mode. The foot-well may include, or be usable for, storage space by a passenger.

As mentioned above, a monitor may be provided. Preferably, the monitor is associated with a shell of each seat unit. The monitor may be mounted on the shell. The monitor may be rotatably mounted for movement to allow the viewing angle of the monitor to be adjusted. The monitor may be mounted for movement between (i) a position in which the monitor is substantially aligned with the shell but at a non-perpendicular viewing angle for a passenger sat in the seat towards which the monitor is directed and (ii) a position in which the monitor is better aligned with a perpendicular viewing angle for a passenger sat in the seat towards which the monitor is directed. The monitor may be an IFE monitor. The footprint of the monitor may share at least some space of the footprint of the foot-well in the console for use by the same passenger as viewing the monitor. The footprint of the monitor may share at least some space behind the foot-well of the console, such a space being suitable for accommodating the legs of the passenger. Such features as described above in relation to the monitor and its position may allow a relatively large monitor to be installed. For example, the monitor may be a 17" monitor or larger. The size of the monitor used here is the conventional one used to measure monitor sizes and refers to the length of the diagonal across the screen of the monitor.

As mentioned above, a seat unit may include an arm-rest surface for use by a passenger in the seat of the seat unit. There may be two arm-rest surfaces, one positioned on one side of the seat and the other position on the opposite side. The armrests of a seat may extend in non-parallel directions. Each seat unit may include an arm-rest which, when viewed in plan, extends in a direction away from the back of the seat at an angle to the direction in which the seat faces. Such an arm-rest may for example extend in a direction that is substantially parallel to the longitudinal axis.

The or each armrest surface may be substantially rectangular in plan view. The preferred, but not essential, armrest surface mentioned above that overhangs the foot-well may include a triangular section that extends over the foot-well and a substantially rectangular section that does not (for example by virtue of being directly vertically above the side wall that defines part of the console/foot-well). There may be a step between the triangular section of the arm-rest surface and the rectangular section, or the sections may be substantially co-planar.

The seat of each seat unit may include a seat back, a seat pan, and a leg rest, which are each moveable between a seat mode position and a bed mode position. The seat of each seat unit may also include a head rest. The seat unit may include a lateral bed surface portion separate from the seat pan. The lateral bed surface portion may be positioned to the side of the seat pan when the seat is seat mode. The lateral bed surface portion may be positioned below the seat pan when the seat is seat mode. The lateral bed surface portion may be positioned such that its footprint is directly adjacent to the footprint of the seat pan when the seat is seat mode. The lateral bed surface portion may be positioned to the side of the seat back when the seat is bed mode. When the seat is in bed mode, the lateral bed surface portion advantageously extends the bed surface defined by the seat back, seat pan, and leg rest. The lateral bed surface portion may be positioned substantially co-planarly with the seat back when the seat is bed mode. The lateral extension of the bed surface (provided by the lateral bed surface portion) is preferably in the region of at least part of the seat back. The lateral extension of the bed surface is preferably in a region approximately a quarter of the way along the length of the bed surface from head to foot. The lateral extension of the bed surface is preferably in a region arranged to accommodate the shoulders of a passenger lying on the seat when in bed-mode. The extra bed space provided by the lateral bed surface portion may allow greater flexibility in use of the bed surface. Having extra width in a portion of the bed may allow a passenger the ability to lie on his or her side, for example with one or both knees drawn up and/or in a position resembling the foetal position. Such flexibility in the use of the bed surface may be further enhanced by ensuring that the passenger when using the seat in bed mode does not perceive the feeling of having his/her hips boxed in by the seat shell of other structural parts of the seat unit. The seat unit is preferably so configured that the region (in a direction from head to foot) immediately beyond the lateral bed surface portion and adjacent and level to the bed surface is free space. Such free space may also serve as providing access to the seat from the aisle (or from an adjacent seat). When viewed in plan, such free space, when bound by the lines of the surrounding structure, the actual bed surface, and a notional line extending in the direction the seat faces from the bed surface at its widest, preferably has an area of about the same as or greater than the area of the lateral bed surface portion. The lateral bed surface portion may be substantially triangular when viewed in plan. The lateral bed surface portion may be located between an arm rest of the seat and the seat pan. The lateral bed surface portion may have a fixed position relative to the seat unit.

When reference to a passenger is made herein, the passenger can be assumed to have a size equal to that of a notional man having a size at the 95th percentile (a 95% man), of the population of 40 year-old white or black American males in the year 2000.

The present invention has particular application in classes of seat that are superior to economy class. For example, the present invention has particular application to a high density business class seat. Economy seat arrangements typically have a shorter pitch and economy seats are typically not required to have a bed-mode. It will be appreciated that business class seats are typically less densely packed than economy seats and are typically more densely packed than first class seats. For example, the pitch between the rows of seats may be about 950 mm or more. The pitch between the rows of seats may be about 1200 mm or less. It will be understood that the "pitch distance" between a first seat positioned aft of a second seat means the distance between a point (for example the foremost point when the seat is in its fully upright position ready for take-off or landing) on the second seat and the corresponding point on the first seat, as measured in the longitudinal direction of the aircraft (i.e. the longitudinal component of the distance between the two points). The pitch distance may be measured once the first and second seats are installed on an aircraft, or are otherwise physically connected to each other ready for installation on an aircraft.

It will be understood that the offset seat angle is the angle between the direction in which the seat faces and the longitudinal axis of the aircraft. The offset seat angle may be about 25 degrees or more. The offset seat angle may be about 35 degrees or less. Typically, the longer the pitch, the lower the offset seat angle and vice versa.

The first minimum width value (minimum width of aisle below, for example 25 inches or 635 mm) may be between 360 mm and 400 mm. The second minimum width value (minimum width of aisle at or above, for example 25 inches or 635 mm) may be between 490 mm and 520 mm. The first distance from the floor may be between 630 mm and 640 mm, for example about 635 mm. The first aisle-width-value may be between 425 mm and 475 mm. The second aisle-width-value may be between 510 mm and 530 mm. The diagonal length of the monitor is preferably greater than 16 inches (406 mm).

There may be a pair of adjacent seat units thus comprising a pair of seats separated by a console. One of the seats may lie on a first notional line which passes through the centre of the seat and which is parallel to the direction in which the seat faces and the other of the seats may lie on a second notional line which passes through the centre of the seat and which is parallel to the first notional line. The separation between the first and second notional lines may be greater than 900 mm (about 35 inches). There may be a further seat unit arranged behind the pair of adjacent seat units and having a seat lying on a third notional line which passes through the centre of the seat and which is parallel to and between the first and second notional lines. The separation between the first and third notional lines (and preferably also between the second and third notional lines) may be more than about 470 mm (18.5 inches). It will be appreciated that this dimension may have an impact on the width of seat pan that can be accommodated by the seat units. Each seat will typically have a back cushion, a seat pan cushion, and a cushioned leg rest portion. The seat pan cushion may have a maximum width that is greater than 450 mm and preferably greater than 470 mm.

One advantage of the embodiments of the present invention is that the seat units are of modular construction, allowing a variety of LOPA configurations, for a given cabin size, without requiring any great changes to the shape and size of the seat units. In accordance with a third aspect of the invention, there is provided an aircraft cabin having a floor and a longitudinal axis, in which cabin there are installed a plurality of modular seat units including (a) first and second seat units in a first row of seat units, (b) a third seat unit in a second row of seat units, and (c) further seat units in a third row of seat units, the first row being positioned between the second and third rows, wherein each modular seat unit includes a seat and a console adjacent to the seat, the seat being configurable between a bed mode and a seat mode, the seats of each of the first, second and third seat units all face in a direction which is inclined to the longitudinal axis by a seat offset angle of the same magnitude (not necessarily the same sign), the seats of at least the first and third seat units face in the same direction (i.e. inclined by the same sign of seat offset angle), the first and second seat units are directly adjacent to each other, the console of the first seat unit accommodates a foot-well for use by a passenger in the seat of the third seat unit. Preferably, there is a passageway defined between the first and third rows facilitating passenger ingress/egress, the passageway providing passenger access between the first and second seat units. The parts that define the structure of each seat unit are advantageously independent of the parts that define the structure of any adjacent seat unit, and particularly parts that define the structure of any adjacent seat unit in the same row. In particular, each seat unit is a modular, stand-alone unit where no element or structure of the seat unit is connected to (other than by the aircraft structure) or shared with any other adjacent seat unit. For example, the console of each seat unit may be defined by walls that are not shared by an adjacent console or structure in the same row. In the prior art, adjacent consoles can share a wall thus providing a space-saving, but in this aspect of the invention, the extra space required by requiring each console to be defined by its own structure is deemed to be acceptable in view of the potential advantages provided by the modular and flexible design. The second row of seat units may be behind the first row of seat units. The seat offset angle is not zero.

Features of the first aspect of the invention may be incorporated, mutatis mutandis, into this third aspect of the invention. Thus, the first seat may have a console adjacent to an aisle. It will be appreciated that the first and second seat units in this aspect of the invention are adjacent to each other and not separated by an aisle (in contrast to the first and second seat units of the first aspect of the invention). The first seat unit may otherwise include the features of the first seat unit of the first or second aspects of the invention. Preferably, the shape and configuration of each modular seat unit is identical or a mirror image of each other seat unit. The console and seat of each seat unit are preferably substantially identically shaped (including being a substantially identical mirror image thereof). The seat units in the cabin are advantageously arranged in straight columns of seat units, each column being parallel to the longitudinal axis. The passageways between pairs of seat units in adjacent rows preferably extend in a direction that is perpendicular to the longitudinal axis. The modular seat units preferably each have a shape that tessellates with other modular seat units in a square-repeating pattern.

The present invention also provides a set of multiple seat units being so configured as to be suitable for installation in an aircraft cabin to create an aircraft cabin according any aspect of the invention described or claimed herein.

The present invention also provides a seat unit, preferably a modular seat unit, being so configured as to be suitable for use as one of those installed in an aircraft cabin according any aspect of the invention described or claimed herein. Preferably, the seat unit has a shape/configuration that facilitates the creation of a high density business class LOPA. The seat unit includes a seat and a console adjacent to the seat, the seat being configurable between a bed mode and a seat mode, and the console of the seat unit accommodating a foot-well for use by a passenger sat in a different seat from that of the seat unit. The seat unit is advantageously arranged for installation in an aircraft cabin with like seat units to form at least a pair of directly adjacent columns of seat units, each column extending parallel to a common column axis, the seat of the seat unit facing a direction inclined to the column axis by a seat offset angle.

The present invention also provides a modular aircraft seat unit including a seat and a console adjacent to the seat, the seat being configurable between a bed mode and a seat mode, the seat unit being arranged for installation in an aircraft cabin with like seat units to form at least a pair of directly adjacent columns of seat units, each column extending parallel to a common column axis, the seat of the seat unit faces a direction inclined to the column axis by a seat offset angle, and the console of the seat unit accommodates a foot-well for use by a passenger sat in a different seat from that of the seat unit. Preferably, each console defines an upper surface providing space useable by a passenger in the seat adjacent to the console, the upper surface having a footprint that at least partially overlaps with the footprint of the foot-well defined by the console. Preferably, each seat unit includes an arm-rest surface for use by a passenger in the seat of the seat unit, the arm-rest surface overhanging a region aft of the foot-well defined by the console of the seat unit. Preferably, each seat unit includes an arm-rest which, when viewed in plan, extends in a direction away from the back of the seat at an angle to the direction in which the seat faces.

The parts that define the structure of each seat unit are advantageously independent of the parts that define the structure of any adjacent seat unit, and particularly parts that define the structure of any adjacent seat unit in the same row. In particular, each seat unit is a modular, stand-alone unit where no element or structure of the seat unit is connected to (other than by the aircraft structure) or shared with any other adjacent seat unit. For example, the console of each seat unit may be defined by walls that are not shared by an adjacent console or structure in the same row. In the prior art, adjacent consoles can share a wall thus providing a space-saving, but in this aspect of the invention, the extra space required by requiring each console to be defined by its own structure is deemed to be acceptable in view of the potential advantages provided by the modular and flexible design.

The seat offset angle is not zero.

The present invention also provides a seat unit suitable for use as one or more of the seat units as described above. Preferably, the seat unit is suitable for use as the first seat unit as described above in relation to the first, second and third aspects of the invention.

It will of course be appreciated that features described in relation to one aspect of the present invention may be incorporated into other aspects of the present invention. For example, the third aspect of the invention may incorporate any of the features described with reference to the first or second aspects of the invention and vice versa.

DESCRIPTION OF THE DRAWINGS

Embodiments of the present invention will now be described by way of example only with reference to the accompanying schematic drawings of which:

FIG. 1a shows a LOPA illustrating a seating arrangement according to a first embodiment of the invention;

FIG. 3a shows a plan view of a portion of the seating arrangement of the first embodiment with one seat in "bed-mode" and the seat in front in "seat-mode";

FIG. 3b shows a cross-section of the seat in "bed-mode" of FIG. 3a taken along line A-A (see FIG. 3a)

DETAILED DESCRIPTION

Figure 1B:
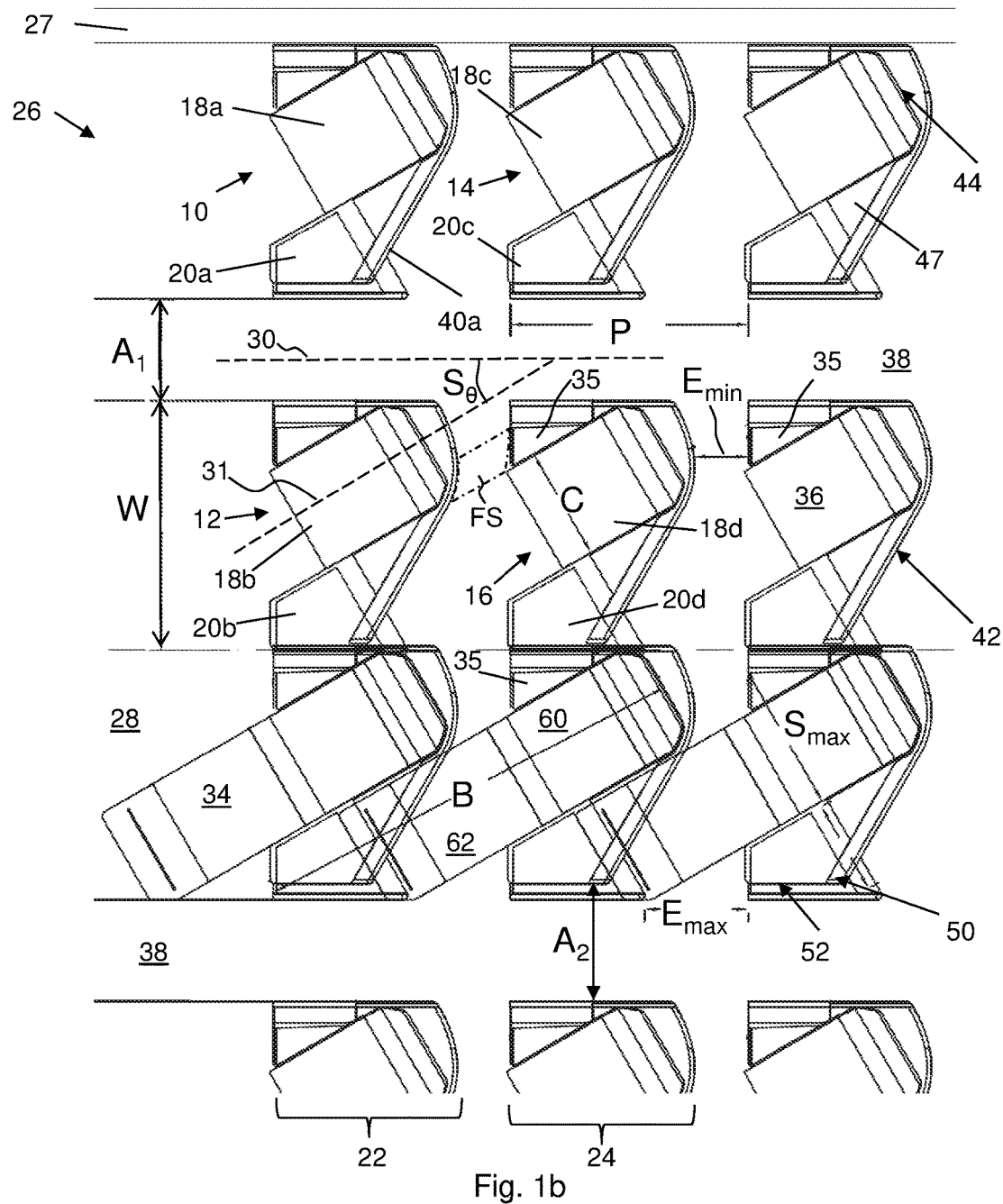
FIG. 1b shows a plan view of part of the seating arrangement of the first embodiment, with key dimensions labelled.

FIGS. 1a and 1b show in plan view part of a LOPA of a high density business class seat arrangement according to a first embodiment of the present invention. The seat arrangement comprises a set of seat units 10 arranged in multiple rows 22, 24 in an aircraft cabin 26, in this case the upper deck of an Airbus A380 aircraft. The seat units each comprise a seat 18 and an associated adjacent console 20. The seats are each configurable between a bed mode 34 and a seat mode 36 and each face in the same direction 31, which is one inclined to the longitudinal axis 30 of the cabin by about 30 degrees (the "seat offset angle" Sθ).

FIG. 1b shows part only of the FIG. 1a layout and thus shows three rows of four seats, the three leftmost seats (looking towards the nose of the aircraft) only being partly shown in FIG. 1b. All seat units 10 are of substantially the same size and shape resulting in a modular and consistent construction and installation of the seats. The seat units shown in FIGS. 1a and 1b are in a 1-2-1 configuration across the width of the cabin 26, providing a single seat unit between the windowed wall 27 of cabin and an aisle 38 and a pair of seat units directly adjacent to each other (in that an aisle does not extend therebetween) and positioned between the two aisles 38. The two aisles 38 extend parallel to the longitudinal axis 30 of the cabin.

FIGS. 2*a* to 4*f* also show seat units 10 and seats 18 according to the first embodiment. FIGS. 2*a* to 2*d* show in perspective view, from different directions, a pair of adjacent seat units 10 positioned between the two aisles 38. As can be seen from FIGS. 2*a* to 2*d*, each seat unit includes, in addition to the seat 18 and the console 20 adjacent to the seat, a shell 42 that provides a degree of privacy to a passenger seated in the seat. The shell includes a first relatively planar portion 45 that extends in a substantially straight line (when viewed from above) from a position, on the console 20 of the seat unit, in front of and to one side of the seat 18 to a position adjacent to the nearest edge of the seat back 44 at where the shell includes a gently curving portion 43 that extends around the back 44 of the seat to a position adjacent to the opposite edge of the seat back 44. The shell includes a second relatively planar portion 46 that extends in a substantially straight line (when viewed from above), parallel to the longitudinal axis, from this opposite edge of the seat back 44 to a position in front of and to the other side of the seat. The ends of the shell in front of the seat (when viewed from above—see FIG. 1*b*, for example) terminate at substantially the same distance along the length of the cabin.

It will be seen from FIGS. 2*a* to 2*d* that the shell 42 is positioned relatively closely to the back 44 of the seat when in seat mode and that the shell 42 has substantially vertical surfaces. The shortest distance (when viewed in plan) from the furthest point on the rear surface of the shell behind the seat to a point on the seat back 44 when in seat mode is of the order of 6 inches (152 mm) and is therefore relatively close to the seat back. Also, the thickness of the shell 42 is such that there is very little clearance between the seat back 44 and the opposing surface of the shell, of the order of an inch (25 mm) or less. There is therefore very little, if any, rearward space for the seat 18 to recline back into when converting from seat mode to a reclined, or a lie-flat, position (in bed mode) 34. The conversion of a seat from seat mode 36 to bed mode 34 requires moving the back 44 of the seat from a substantially upright position to a substantially horizontal position with the seat back 44 moving from the position shown in for example FIG. 2*a* to the position shown in for example FIG. 3*b*.

The first relatively planar portion 45 of the shell supports an IFE monitor 56, which in this case is a 17 inch monitor. The monitor 56 is mounted on a hinge mounting on its right-hand edge. The monitor 56 is thus rotatable between a stowed position in which it is substantially aligned, and flush, with the shell 42 and a deployed position in which the monitor is better oriented for the purposes of a passenger is the associated seat viewing the screen head-on. It will be seen that the monitor 56 is sufficiently wide that it extends above both the foot-well 40 of the console for use by the same passenger as viewing the monitor and some of the space aft of that foot-well, such that some of the monitor 56 overhangs the region where the passengers legs may extend, particularly when the seat is in bed mode.

Figure 2A:
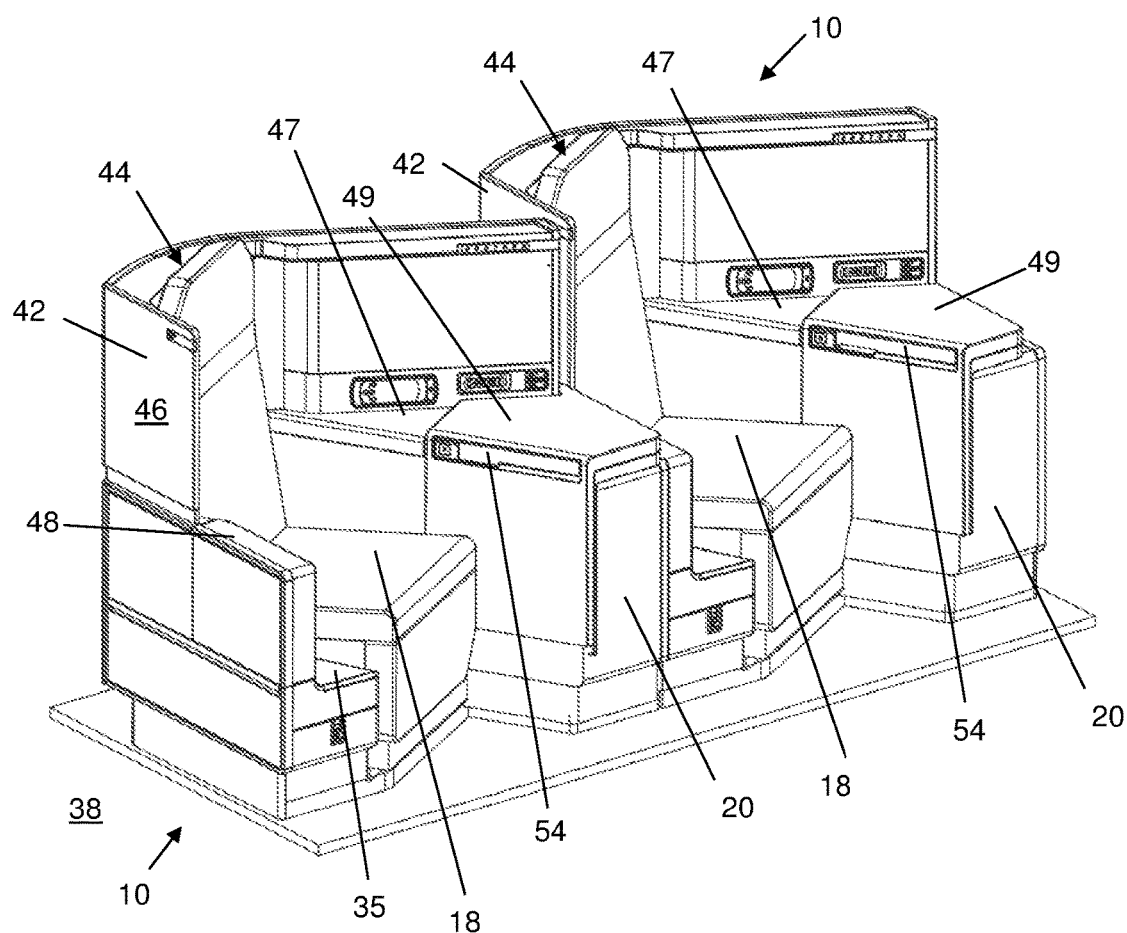
FIGS. 2a to 2d show perspective views from different directions of a pair of seat units from the seating arrangement of the first embodiment.
Figure 2B:
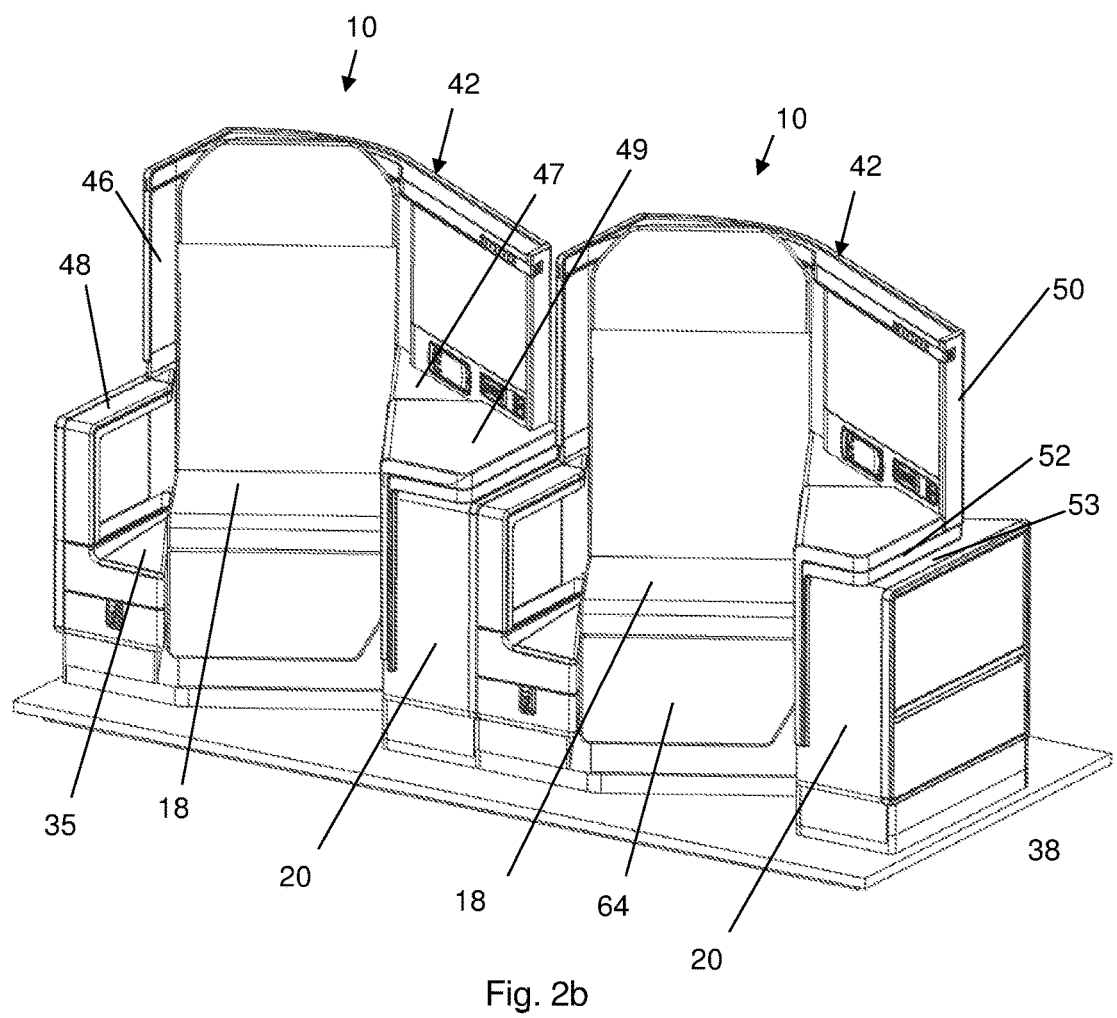
Figure 2C:
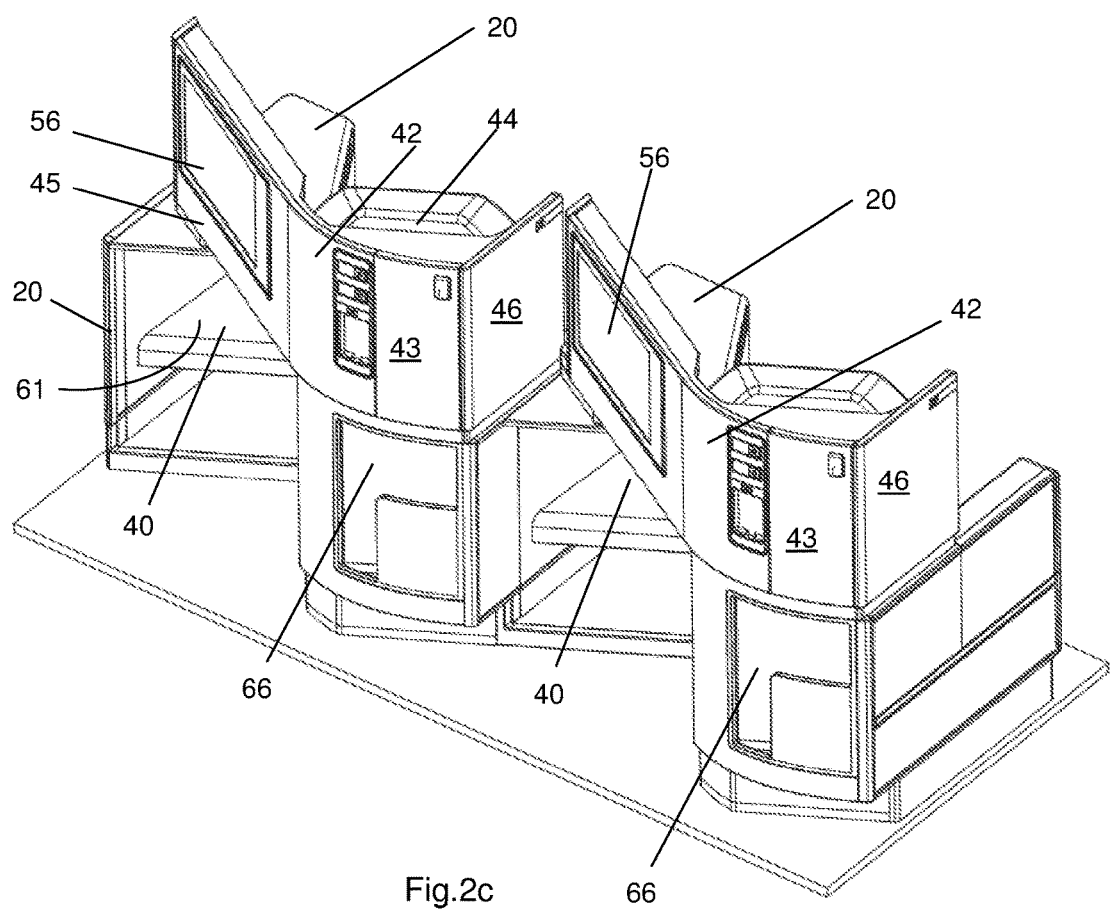
Figure 2D:
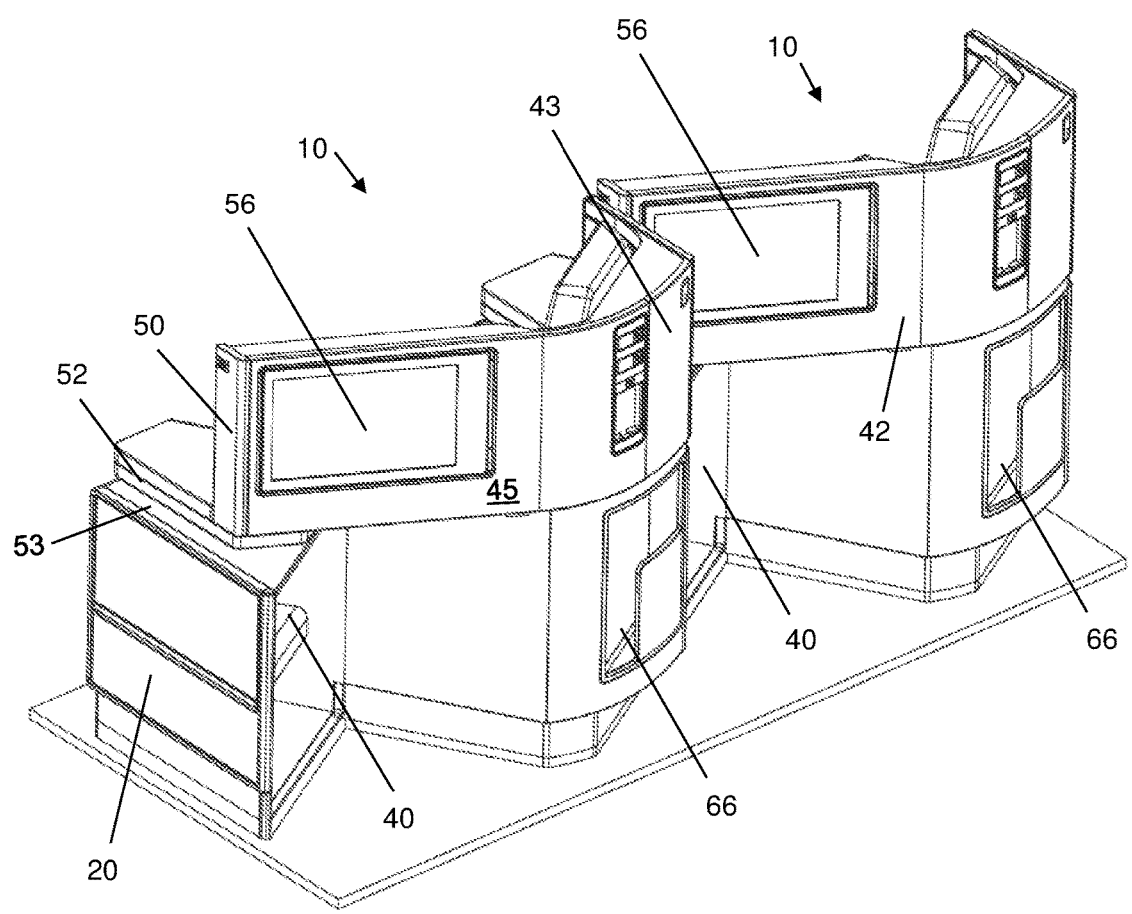
Figure 4A:
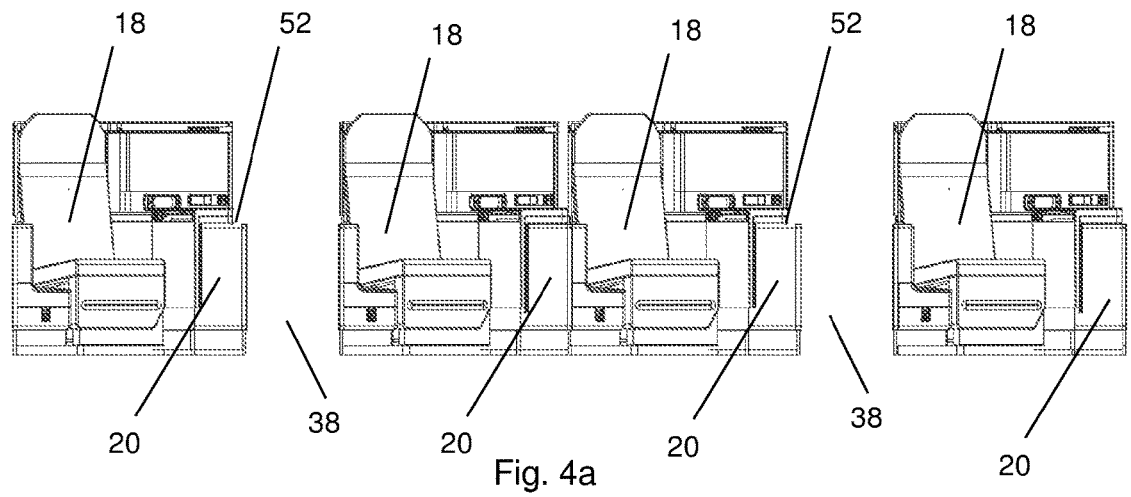
FIG. 4a shows a front view of the seating arrangement of the first embodiment.
Figure 4B:
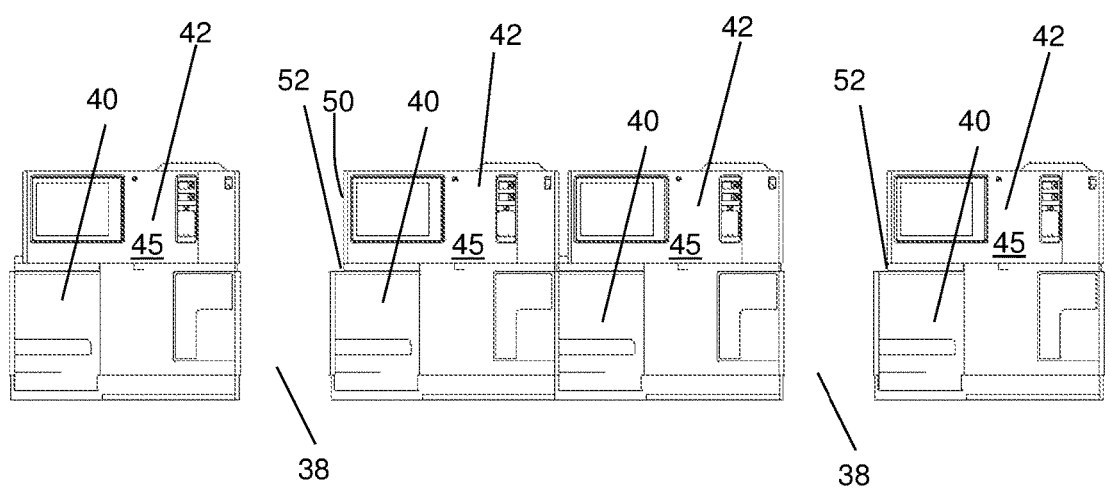
FIG. 4b shows a rear view of the seating arrangement of the first embodiment.
Figure 4C:
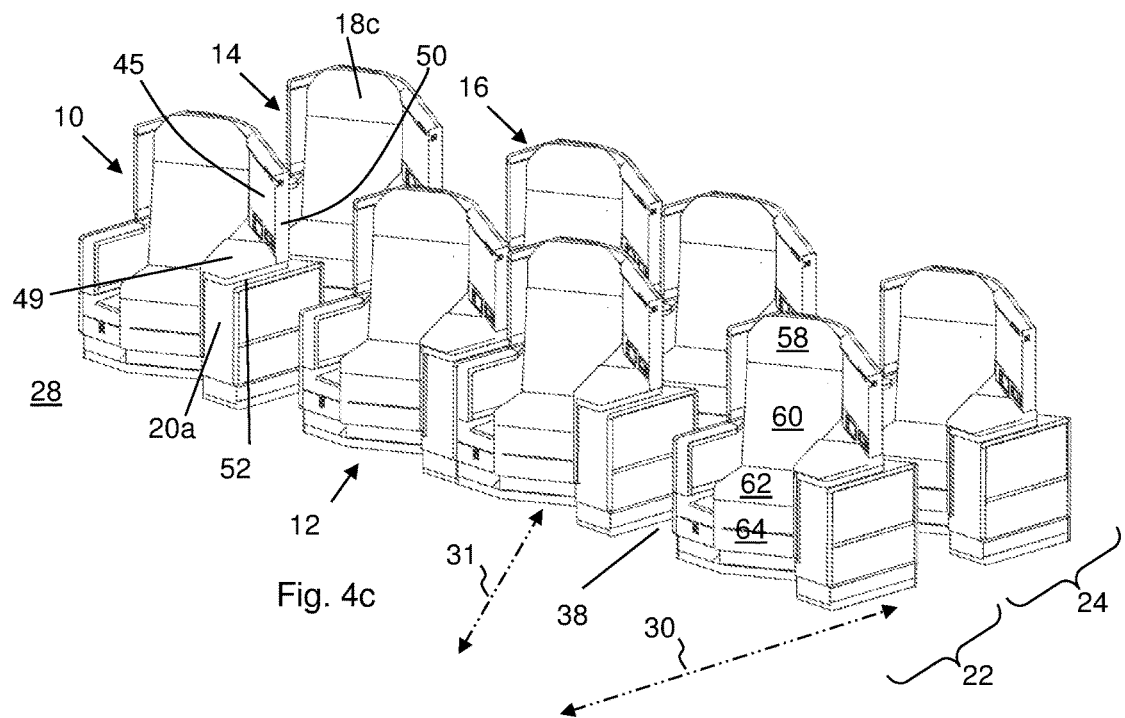
FIGS. 4c to 4f show perspective views of the seating arrangement of the first embodiment from different directions.
Figure 4D:
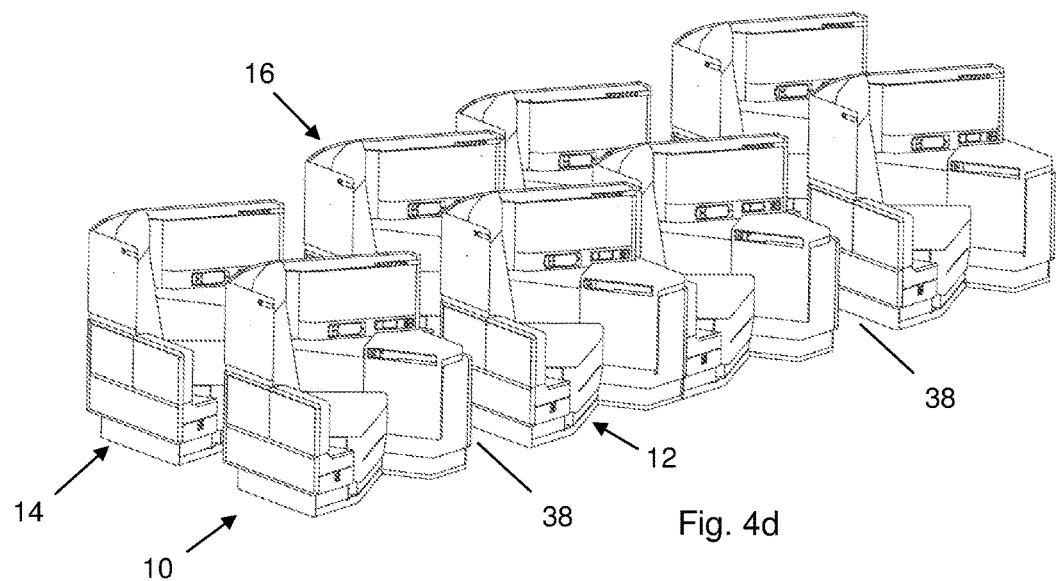
Figure 4E:
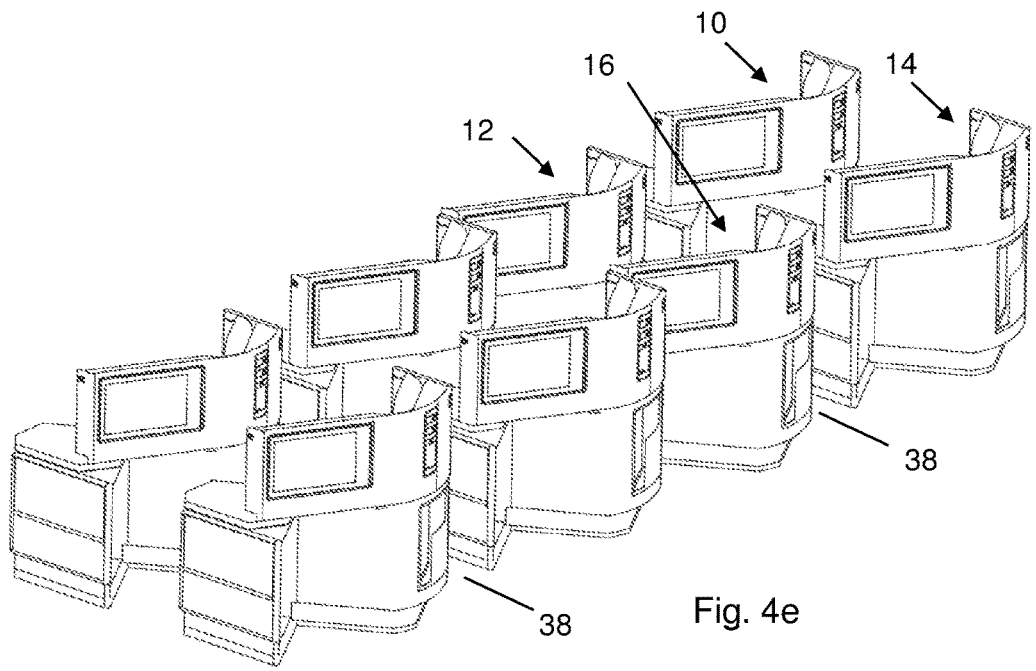
Figure 4F:
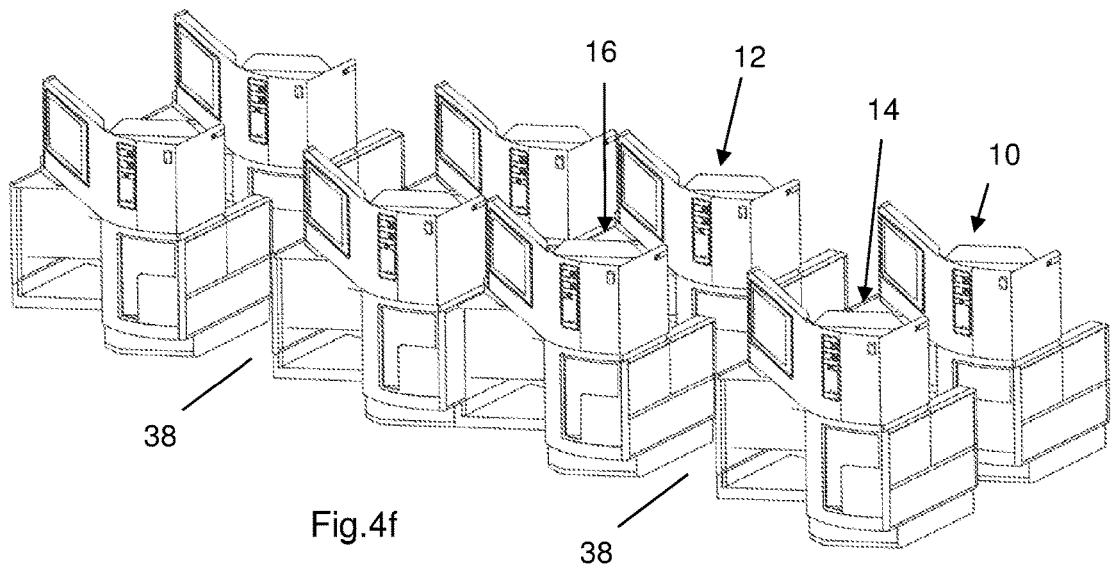

As can be seen in FIGS. 2*a*, 2*b* and 3*b*, the seat comprises a head rest 58, a seat back 60, a seat pan 62, and a leg rest 64, which are mounted for movement on a seat support structure (not visible in the Figures). The console 20 of each seat unit (if not the rearmost row) accommodates a foot-well 40 for use by a passenger in the seat in the row behind. The foot-well 40 accommodates a shelf 61 which serves as an ottoman. The foot-well 40 also includes storage space 63 beneath the shelf 61 for use by a passenger.

The ottoman 61 cooperates with the leg rest 64 of the seat when the seat is in bed-mode so as to define a "lie-flat" bed 34. FIGS. 3*a* and 3*b* show the seat in bed-mode. FIG. 3*b* shows that the bed is angled slightly with respect to the cabin floor 28, such that the head rest 58 is further from the floor than the leg rest 64. Arranging the seat, when in bed-mode, to be inclined relative to the floor 28 in this manner takes into account the pitch angle of the aircraft when in cruise mode. It will be noted (see FIG. 2*b* for example) that a corner at the lower end of the leg-rest 64 is clipped, such that the lower end of the leg-rest 64 tapers to a width slightly less than the full width of the seat 18. When the seat 18 is in bed-mode 34 (see FIG. 1*b* for example), the edge that defines the clipped corner is substantially parallel with the longitudinal axis 30 of the cabin. The ottoman 61 has a similarly tapering shape, with one lateral edge (as viewed in plan) being substantially parallel to the seat axis 31 (angled to the longitudinal axis by the seat offset angle, S$\theta$) and the other lateral edge being substantially parallel to the longitudinal axis 30 of the cabin 26. The aft edge of the ottoman 61 is substantially perpendicular to the seat axis 31 and the fore edge of the ottoman 61 is substantially perpendicular to the longitudinal axis 30 of the cabin. The shape of the ottoman 61 when viewed in plan is thus an irregular quadrilateral in the form of a truncated right-angled triangle, in this embodiment also having two internal right-angles.

The length B of the bed 34 formed by the seat 18, when in bed mode, and the ottoman 61 is about 76 inches (1935 mm). The seat-pan cushion 62 has a width C of about 19.5 inches (495 mm). The bed surface formed by the seat 18 and the ottoman 61 is widened in the region of the shoulders of the passenger by means of a fixed triangular cushioned surface that forms a lateral bed surface extension 35. In seat mode the lateral bed surface extension 35 is positioned directly adjacent to but below the seat pan cushion 62. The bed width is locally increased in this embodiment to a maximum of 26.3 inches (668 mm) and the lateral bed surface extension provides about an extra 45 square inches (about 290 cm$^2$) of useable bed surface. There is also a region of free space that enhances the flexible use of the bed surface. With reference to FIG. 1*b*, the free space referred to here is one which is defined in plan view and is labelled with reference numeral FS. The space FS is bound on its sides by the seat pan 62 when in bed mode, the seat back 60 when in bed mode, the rear surface of the shell 42 of the seat in front, the lateral bed surface extension 35, and the notional line extending in the direction the seat faces 31 from the bed surface at its widest point. The space FS has an area of about 65 square inches (about 420 cm$^2$). The extra bed space provided by the lateral bed surface extension and the provision of the adjacent free space FS allow greater flexibility in use of the bed surface, as the passenger can lie on his/her back with his/her shoulders using the extra space or can lie on his/her side so that the body resembles an "S" shape. It is believed that passengers can still attain a relatively comfortable sleeping position on the bed surface despite a small part of the body overhanging the free-space FS.

It will be seen that the headrest 58 in seat mode 36 is in a vertically configured position that is directly adjacent to the shell 42 and that the headrest 58 in bed mode 36 is in a horizontally configured position that is also directly adjacent to the shell 42, albeit at a lower level.

As can be seen in FIG. 2*a*, the console 20 of each seat unit includes an upper surface that functions as a storage shelf or side table 49 providing space useable by a passenger in the seat 18 adjacent to the console 20 (the seat belonging to the same seat unit 10 as the console). The table area 49 has a footprint that is substantially wholly contained within the footprint of the part of the console that defines the foot-well 40.

The seats each include two arm-rests 47, 48. With reference to FIG. 2a, there is a first triangular arm-rest surface 47 on the console, the arm-rest surface 47 being adjacent to but aft of (and stepped down from) the table area 49 (also called an "upper surface") on the console. The arm-rest surface 47 overhangs a space aft of the foot-well 40 of the console across which aft space the legs of a passenger whose feet are in the foot-well extend. The inner edge of the first triangular armrest 47 extends away from the seat 18 in a direction parallel to the seat axis 31, but the outer edge of the first triangular armrest 47 extends away from the seat in a direction angled away from the seat axis. It will be noted that there is a step 52 down from the table area 49 to a far surface 53 on the console located on a part of the console furthest from the seat of the same seat unit. The height of this console far surface 53 is just under 25 inches from the cabin floor.

A second elongate rectangular armrest 48 is also provided which extends in a direction parallel to the longitudinal axis 30 and therefore in a direction angled away from seat axis 31. The arms of the passenger seated in the seat may therefore be rested on armrests 47, 48 in such a way that both arms extend away from the passenger in a splayed apart manner.

FIGS. 4a to 4f show two rows 22, 24 from the seat arrangement of the first embodiment. Thus, there are first 10 and second 12 seat units in a first row of seat units 22 and a third 14 and fourth 16 seat units in a second row of seat units 24, the first 10 and second 12 seat units being separated by the aisle 38. The third seat unit 14 is located immediately behind the first seat unit 10. The fourth seat unit 16 is located immediately behind the second seat unit 12. The console of the first seat unit 20a is located directly adjacent to the aisle 38. At least some of the advantages of the first embodiment of the invention arise from the way in which the aisle space is defined. The footprint of the lower portion (below a height of 25 inches from the floor of the cabin) of the console of the first seat unit 20a defines the extent of one side of the adjacent aisle 38. The minimum width of the aisle at a height below 25 inches (635 mm) from the floor is about 17.5 inches (445 mm). As mentioned above, at a height just below the 25 inches height, the shape of the console steps back away the aisle (step 52). The end 50 of the first relatively planar portion 45 of the shell terminates at a location on the console 20 at the same position (when viewed in plan) as the step 52 in the console upper surface 49. Thus, the minimum width of the aisle (A$_2$) at a height above 25 inches from the floor is wider than the width (A$_1$) below 25 inches (635 mm), and is about 20.5 inches. Thus, space below 25 inches (635 mm) and next to the aisle is utilised, at least on one side of the aisle, by the foot-well 40 which does not need to extend higher than 25 inches (635 mm) which thus enables the seating arrangement to meet the minimum aisle width requirements above the height of 25 inches (635 mm).

As mentioned above, the first embodiment is in the form of a set of seats suitable for installation on the upper deck of an A380 aircraft. The dimensions of the LOPA that make the set suitable for installation on the A380 upper deck are set out below:

| Dimension | Imperial | Metric |
| --- | --- | --- |
| seat pitch - P | 41.0 inches | 1041 mm |
| seat angle - θ | 30 degrees | 30 degrees |
| seat cushion width - C | 19.5 inches | 495 mm |
| maximum seat width - Smax | 28.35 inches | 669 mm |

-continued

| Dimension | Imperial | Metric |
| --- | --- | --- |
| bed length - B | 76.0 inches | 1931 mm |
| Emin - minimum egress width | 9.4 inches | 237 mm |
| Emax - maximum egress width | 17.8 inches | 452 mm |
| Monitor size | 17 inches | 432 mm |
| A1 - first aisle width value (minimum width below 25") | 17.55 inches | 446 mm |
| A2 - second aisle width value (minimum width above 25") | 20.5 inches | 521 mm |
| W - width of seat unit | 43.25 inches | 1099 mm |

The width of the seat unit in this case is measured as the maximum width of the seat unit (shell 42+console 20+seat 18) as measured in the direction perpendicular to longitudinal axis 30.

Other advantageous features of the first embodiment are that the rows each extend in a direction perpendicular to the longitudinal axis 30, thereby simplifying installation and design for a particular aircraft cabin 26. The direction of the aisles 38 as defined by the loci of the centre points of minimum width measurements taken along the length of the aisle extend in a straight line parallel to the longitudinal axis 30 which aids easy passage down the aisle for crew and passengers alike.

Given that the adjacent lateral edges of two seats, one in front of the other, are, when in bed mode, very close to each other, when viewed in plan (see FIG. 1b for example), the distance between the centre lines of such seats may be only slightly greater than the seat cushion width. The separation between the centre lines of two adjacent seats of a pair of seats in the centre cabin area may therefore be slightly greater than twice the seat cushion width. In this embodiment, the separation between the centre lines of two such adjacent seats is about 40 inches (about 1015 mm). It will be appreciated that the frontmost and rearmost seat units in the LOPA may be differently configured/used. The frontmost seat units have in front of them dedicated foot-wells and a monitor which may be mounted differently. The monitor and or foot-wells may be accommodated on or in a bulkhead in front of the foremost seat or in a monument mounted on the cabin floor. The consoles of the rearmost seat units do not need to house an ottoman and the rear shell does not need to accommodate a monitor or storage spaces for use by passengers.

Figure 5:
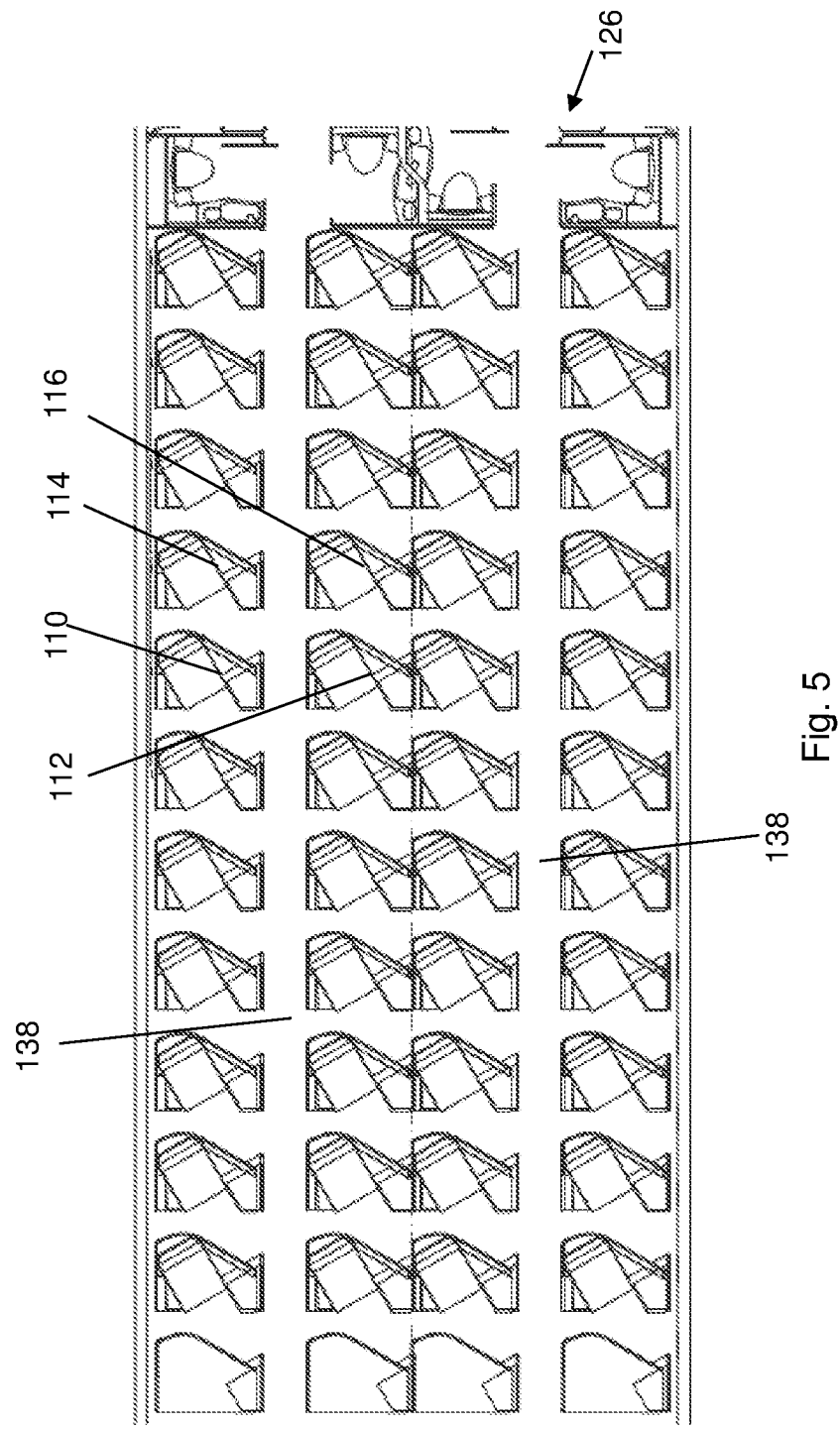
FIG. 5 shows a LOPA according to a second embodiment of the invention.

FIG. 5 shows a LOPA according to a second embodiment and shows a set of seats suitable for installation on a Boeing 787 aircraft or on an Airbus A350 aircraft. The key dimensions of the LOPA of the second embodiment are set out below:

| Dimension | Imperial | Metric |
| --- | --- | --- |
| seat pitch - P | 41 inches | 1041 mm |
| seat angle - θ | 30 degrees | 30 degrees |
| seat cushion width - C | 19.5 inches | 495 mm |
| maximum seat width - Smax | 26.3 inches | 668 mm |
| bed length - B | 76.9 inches | 1954 mm |
| Emin - minimum egress width | 9.3 inches | 237 mm |
| Emax - maximum egress width | 17.3 inches | 440 mm |
| Monitor size | 17 inches | 432 mm |
| A1 - first aisle width value (minimum width below 25") | 17.55 inches | 446 mm |
| A2 - second aisle width value (minimum width above 25") | 20.5 inches | 521 mm |
| W - width of seat unit | 44.2 inches | 1124 mm |

There is more room across the width of the cabin 126 available for the seat units (110,112,114,116) and aisles 138 in this second embodiment, as compared to the width of the cabin available for the seat units in the first embodiment. Thus, whilst the pitch and seat angle are the same as the first embodiment, the bed length is longer, the seat unit width and seat unit length are correspondingly longer. Given that the pitch remains the same at 41 inches, the minimum and maximum egress dimension is shortened slightly. A larger (19 inch) monitor is provided.

Figure 6:
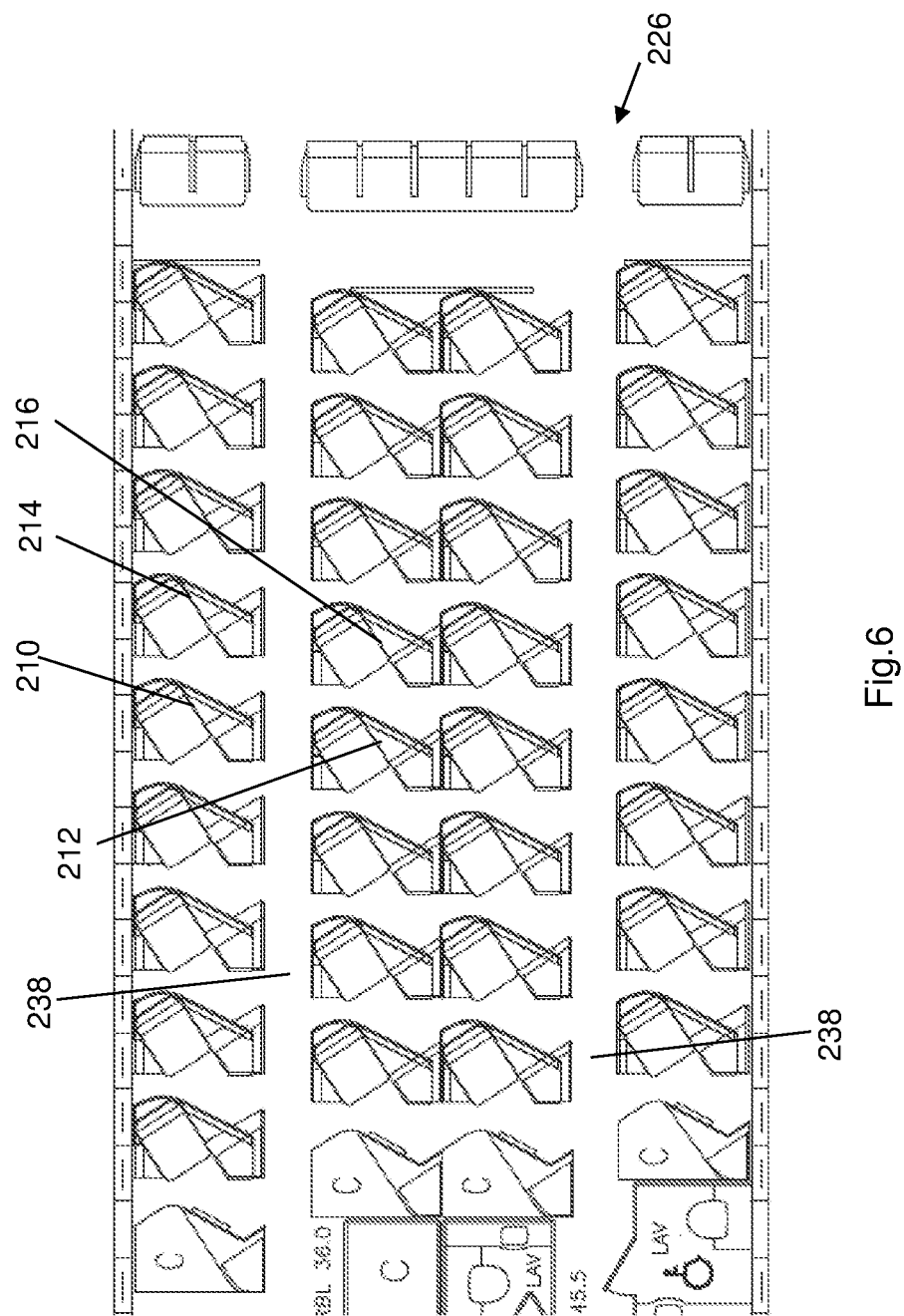
FIG. 6 shows a LOPA according to a third embodiment of the invention.
Figure 7:
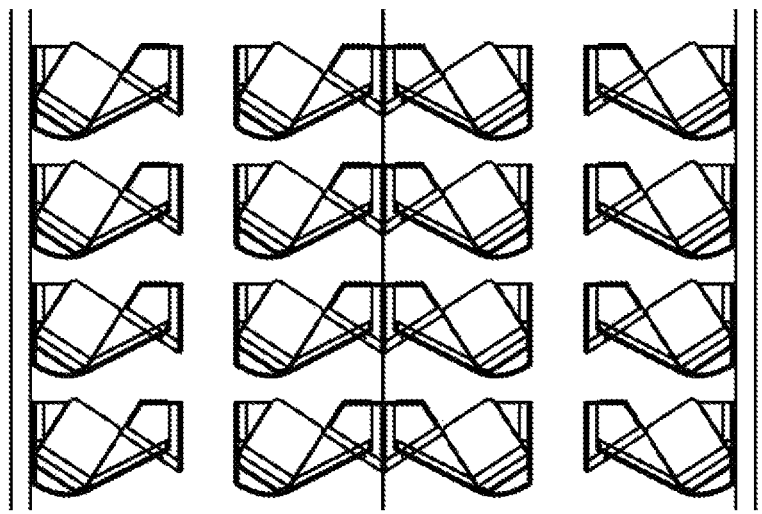
FIG. 7 shows a LOPA according to a fourth embodiment of the invention.
Figure 8:
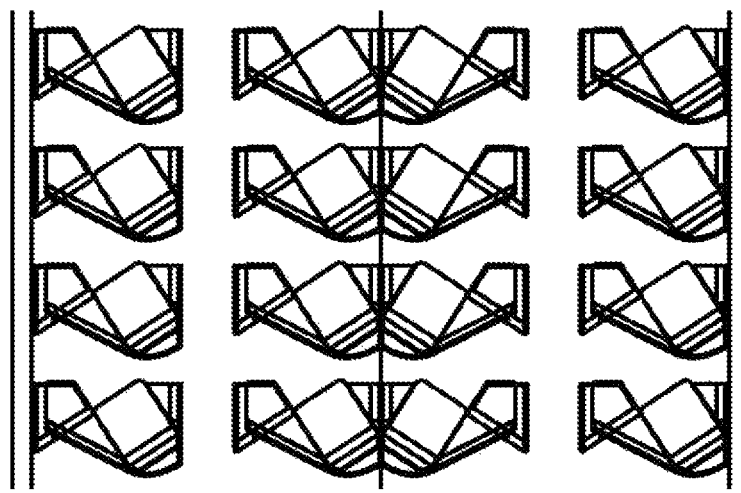
FIG. 8 shows a LOPA according to a fifth embodiment of the invention.
Figure 9:
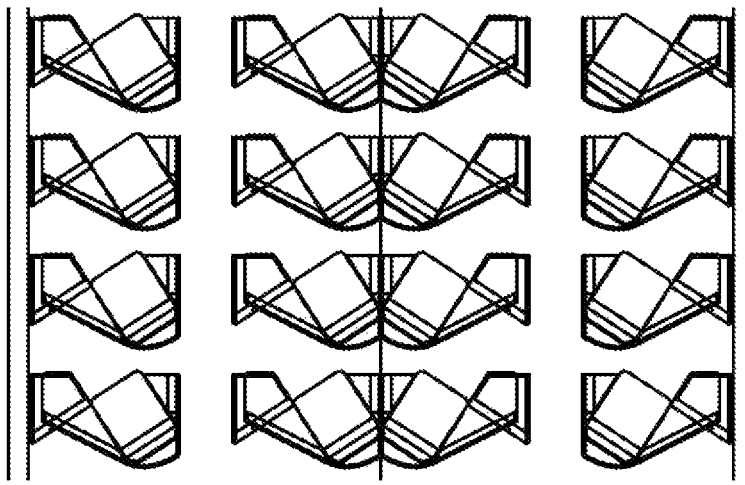
FIG. 9 shows a LOPA according to a sixth embodiment of the invention.
Figure 10:
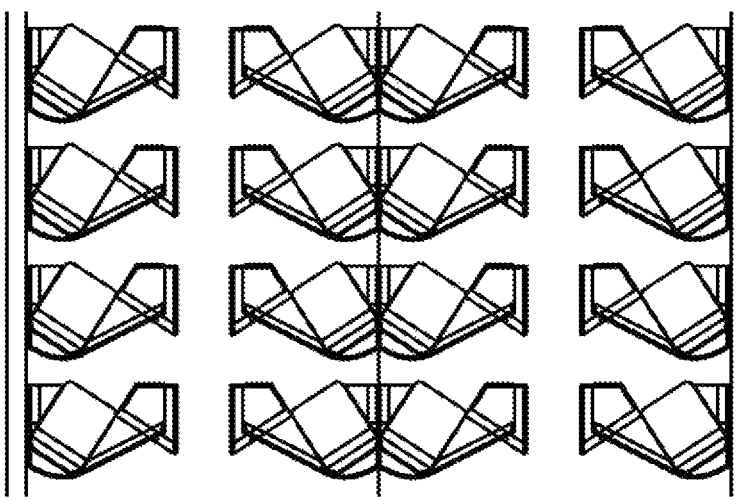
FIG. 10 shows a LOPA according to a seventh embodiment of the invention.

FIG. 6 shows a LOPA according to a third embodiment and shows a set of seats suitable for installation on a Boeing 747 or 777 aircraft or on the main deck of an Airbus A380 aircraft. The key dimensions of the LOPA of the second embodiment are set out below:

| Dimension | Imperial | Metric |
| --- | --- | --- |
| seat pitch - P | 39 inches | 991 mm |
| seat angle - θ | 33 degrees | 33 degrees |
| seat cushion width - C | 19.5 inches | 495 mm |
| maximum seat width - Smax | 26.3 inches | 669 mm |
| bed length - B | 76.2 inches | 1935 mm |
| Emin - minimum egress width | 8.5 inches | 216 mm |
| Emax - maximum egress width | 16.4 inches | 417 mm |
| Monitor size | 19 inches | 483 mm |
| A1 - first aisle width value (minimum width below 25") | 21.6 inches | 549 mm |
| A2 - second aisle width value (minimum width above 25") | 17.5 inches | 444 mm |
| W - width of seat unit | 48.5 inches | 1232 mm |

There is more room across the width of the cabin 226 available for the seat units 210,212,214,216 and the aisles 238 in this third embodiment than in both the first and second embodiments. It therefore makes better use of the width of the cabin in this case, to increase the seat angle to 33 degrees, which allows the pitch to be reduced to 39 inches (991 mm) without significantly compromising on the length of the bed available (still 76 inches—1935 mm). The seat unit width is wider (at 1232 mm). The minimum and maximum egress dimensions are shortened slightly in comparison to the second embodiment. A large (19-inch) monitor is provided.

It will be noted that in FIG. 6, the outboard seats are positioned in staggered configuration in relation to the pairs of seats in the centre of the row, such that that the window seats are positioned at a distance along the cabin measured in a longitudinal direction different from the corresponding distance for an inboard seat unit.

FIGS. 7 to 10 show LOPAs of fourth to seventh embodiments of the invention. These Figures illustrate the advantage provided by having the seat units designed and manufactured in a modular manner. Thus, a variety of LOPA configurations may be used in a cabin of a given size, without requiring any great changes to the shape and size of the seat units. The individual seat units are essentially the same as those described in relation to the first embodiment. It will be noted that the seats of the seat units illustrated in the fourth to seventh embodiments are all inclined by the same seat offset angle, with some inclined in one direction (one sign of offset angle) and the others inclined by the same angle but in the opposite (not reverse) direction (the opposite sign of offset angle). The modularity and flexibility of orientation and/or longitudinal position of the seat units in the LOPAs are partly provided by means of the parts that define the structure of each seat unit being independent of the parts that define the structure of any other seat unit. No wall or partition of one seat unit serves as a wall or partition for a directly adjacent seat unit in the same row. Whilst the seat units in a column need to face the same way, in these embodiments, for the foot wells of one seat unit to be usable by the seat behind (in the seat-facing direction), the sign of seat offset angle, and the longitudinal position along the length of the cabin of a different column of seats can be varied. It is preferred for there to be a straight passageway, perpendicular to the longitudinal axis, between adjacent seats in successive rows facilitating passenger ingress/egress, and access between the adjacent seat units.

Each of the fourth to seventh embodiments has seats arranged such that for any seat which has a back that is directly adjacent to the aisle (the seat itself being inclined to face away from the aisle), the seat on the opposite side of the aisle faces towards the aisle and has a console between it and the aisle. Thus, there are no seats that are positioned back-to-back across an aisle in any of the fourth to seventh embodiments.

Reference is made herein to the "footprint" of various things. It will be understood that the footprint of an object in an aircraft cabin is the 2-dimensional shape on the cabin floor defined by the outline of the object when viewed in plan view (e.g. in a direction that is normal to the plane defined by the cabin floor).

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Above, it is suggested that substantially all seats have the same shape and configuration. It will be appreciated however that certain seat units may need to be configured differently, depending on the particular circumstances. For example, a seat unit in the front or rear row of seat units may be different. Also, if the radius of curvature of the cabin side walls is relatively low such that there is correspondingly less room at head height (when sitting), there may be a need to have a slightly different shape of seat unit, especially any that have the seat backs against the cabin side wall (e.g. window seats).

When the seats are the foremost seats in a region of the cabin, it may be beneficial to arrange the table in much the same way as described above, but in the monument in front of the seats rather than in a console.

There may be some seats that face in a different direction. For example, the window seats in the illustrated embodiments that face towards the window (with backs to the aisle) could be positioned at an opposite seat offset angle (i.e. measured clockwise with respect to the longitudinal axis instead of anti-clockwise). Such an arrangement, could, if the cabin side-wall has a sufficiently shallow curvature allow even better efficient use of aisle space, as it would allow another console/foot-well to use the extra space in the aisle available at below 25 inches.

It will be appreciated that some or all seat units in one or more rows could be configured in reverse, facing generally aft, rather than facing forwards (and generally in the direction of travel).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft cabin having a floor and a longitudinal axis, in which cabin there are installed a plurality of seat units including first and second seat units in a first row of seat units and a third seat unit in a second row of seat units, wherein
    each seat unit includes a seat and a console adjacent to the seat, the seat being configurable between a bed mode and a seat mode,
    the cabin includes an aisle extending parallel to the longitudinal axis,
    the first and second seat units are separated by the aisle, there being a first aisle-width-value equal to the shortest distance between the first and second seat units at any height less than a first distance from the floor, there being a second aisle-width-value equal to the shortest distance between the first and second seat units at any height greater than the first distance from the floor,
    the first aisle-width-value is less than the second aisle-width-value,
    the seats of each of the first, second and third seat units all face in the same direction, said direction being inclined to the longitudinal axis by a seat offset angle, the console of the first seat unit is directly adjacent to the aisle and accommodates a foot-well for use by a passenger in the seat of the third seat unit,
    at least a part of the console of the first seat unit, in a region no higher than the first distance from the floor, extends further into the aisle than the rest of the first seat unit in a region higher than the first distance from the floor, and
    each seat unit includes an arm-rest surface for use by a passenger in the seat of the seat unit, the arm-rest surface overhanging a region aft of the foot-well defined by the console of the seat unit.

2. An aircraft cabin according to claim 1, wherein the each seat unit includes a shell, which extends around the back of the seat and forward of the seat back on both sides to enhance privacy and wherein the shortest distance that defines the second aisle-width-value, extends to a point on the shell of the first seat unit.

3. An aircraft cabin according to claim 2, wherein the shell of each seat unit extends to a region above the console.

4. An aircraft cabin according to claim 2, wherein the shell of each seat unit accommodates a monitor rotatably mounted for movement between a position in which the monitor is substantially aligned with the shell but at a non-perpendicular viewing angle for a passenger sat in the seat towards which the monitor is directed and a position in which the monitor is substantially aligned with a perpendicular viewing angle for a passenger sat in the seat towards which the monitor is directed.

5. An aircraft cabin according to claim 1, wherein the first row of seat units and the second row of seat units each extend from a respective window seat unit on one side of the cabin to a respective window seat unit on the opposite side of the cabin, there being one or more aisles extending parallel to the longitudinal axis.

6. An aircraft cabin according to claim 5, wherein each seat unit in each row that is adjacent to an aisle either faces towards the aisle or away from the aisle, and in respect of any seat unit adjacent to an aisle which faces away from the aisle, the nearest seat unit on the opposite side of the aisle faces the aisle.

7. An aircraft cabin according to claim 1, wherein all seats in each of the first row and the second row face in the same direction.

8. An aircraft cabin according to claim 1, wherein each console defines an upper surface providing space useable by a passenger in the seat adjacent to the console, the upper surface having a footprint that at least partially overlaps with the footprint of the foot-well defined by the console.

9. An aircraft cabin according to claim 1, wherein each seat unit includes an arm-rest (a) providing the arm-rest surface and (b) which, when viewed in plan, extends in a direction away from the back of the seat at an angle to the direction in which the seat faces.

10. An aircraft cabin according to claim 1, wherein
    the seat of each seat unit includes a seat back, a seat pan, and a leg rest, which are each moveable between a seat mode position and a bed mode position,
    the seat unit includes a lateral bed surface portion separate from the seat pan, the lateral bed surface portion is positioned to the side of the seat pan when the seat is in the seat mode position,
    the lateral bed surface portion is positioned to the side of the seat back when the seat is in the bed mode position, the lateral bed surface portion thus extending the bed surface laterally in the region of at least part of the seat back when in the bed mode position.

11. An aircraft cabin according to claim 1, wherein the pitch between the rows of seats is between 950 mm and 1200 mm and the offset seat angle is between 25 and 35 degrees.

* * * * *